United States Patent
Choudhary et al.

(10) Patent No.: US 11,348,581 B2
(45) Date of Patent: May 31, 2022

(54) MULTI-MODAL USER INTERFACE

(71) Applicant: QUALCOMM Incorporated, San Diego, CA (US)

(72) Inventors: Ravi Choudhary, San Diego, CA (US); Lae-Hoon Kim, San Diego, CA (US); Sunkuk Moon, San Diego, CA (US); Yinyi Guo, San Diego, CA (US); Fatemeh Saki, San Diego, CA (US); Erik Visser, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 172 days.

(21) Appl. No.: 16/685,946

(22) Filed: Nov. 15, 2019

(65) Prior Publication Data
US 2021/0012770 A1    Jan. 14, 2021

Related U.S. Application Data

(60) Provisional application No. 62/873,775, filed on Jul. 12, 2019.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/017* (2013.01); *G06F 3/038* (2013.01); *G06F 3/0484* (2013.01);
(Continued)

(58) Field of Classification Search
CPC ......... G10L 15/22; G10L 15/26; G06F 3/167; G06F 3/0487; G06F 3/0488
See application file for complete search history.

(56) References Cited

U.S. PATENT DOCUMENTS 8,442,820 B2   5/2013   Kim et al.
9,123,341 B2   9/2015   Weng et al.
(Continued)

FOREIGN PATENT DOCUMENTS

| EP | 2995040 A2 | 3/2016 |
| WO | 2014070872 A2 | 5/2014 |

OTHER PUBLICATIONS

International Search Report and Written Opinion—PCT/US2020/041499—ISA/EPO—dated Oct. 6, 2020.

*Primary Examiner* — Daniel Abebe
(74) *Attorney, Agent, or Firm* — Moore IP

(57) ABSTRACT

A device for multi-modal user input includes a processor configured to process first data received from a first input device. The first data indicates a first input from a user based on a first input mode. The first input corresponds to a command. The processor is configured to send a feedback message to an output device based on processing the first data. The feedback message instructs the user to provide, based on a second input mode that is different from the first input mode, a second input that identifies a command associated with the first input. The processor is configured to receive second data from a second input device, the second data indicating the second input, and to update a mapping to associate the first input to the command identified by the second input.

30 Claims, 11 Drawing Sheets

(51) Int. Cl.
*G06F 3/01* (2006.01)
*G10L 15/26* (2006.01)
*G06F 3/038* (2013.01)
*G06F 3/04883* (2022.01)
*G06F 3/0484* (2022.01)
*G06F 9/451* (2018.01)
*G10L 15/20* (2006.01)

(52) U.S. Cl.
CPC .......... *G06F 3/04883* (2013.01); *G06F 3/167* (2013.01); *G06F 9/451* (2018.02); *G10L 15/20* (2013.01); *G10L 15/26* (2013.01); *G06F 2203/0381* (2013.01); *G10L 2015/223* (2013.01); *G10L 2015/228* (2013.01)

(56) References Cited

U.S. PATENT DOCUMENTS

| | | | |
|---|---|---|---|
| 9,653,067 B2 | 5/2017 | Brooks et al. | |
| 9,710,223 B2* | 7/2017 | Johnston | G10L 15/22 |
| 10,446,141 B2* | 10/2019 | Krishnamoorthy | G10L 15/02 |
| 2010/0241432 A1* | 9/2010 | Michaelis | H04N 7/15 |
| | | | 704/260 |
| 2015/0007042 A1 | 1/2015 | Gay et al. | |
| 2016/0034249 A1* | 2/2016 | Lee | G06F 3/012 |
| | | | 704/275 |
| 2017/0017719 A1* | 1/2017 | Aravamudan | G06F 16/3322 |
| 2018/0254044 A1* | 9/2018 | Jitkoff | H04M 1/72457 |
| 2018/0329677 A1* | 11/2018 | Gruber | G06F 3/0488 |

* cited by examiner

MULTI-MODAL USER INTERFACE

I. CROSS-REFERENCE TO RELATED APPLICATIONS

The present application claims priority from U.S. Provisional Patent Application No. 62/873,775, filed Jul. 12, 2019, entitled "MULTI-MODAL USER INTERFACE," which is incorporated herein by reference in its entirety.

II. FIELD

The present disclosure is generally related to user interfaces and more specifically, to user interfaces that support multiple modalities of user input.

III. DESCRIPTION OF RELATED ART

Many user interfaces are based on automatic speech recognition (ASR) and natural language processing (NLP) and are trained over many different commands, accents, and languages to be useful over a large customer base. Training such user interfaces for broad applicability among a variety of users requires extensive resources, and much of the training to make the user interface generally applicable for a large customer base is "wasted" on a per-user basis because each individual user typically only uses a single language, accent, and sub-set of supported commands.

IV. SUMMARY

According to one implementation of the present disclosure, a device for multi-modal user input includes one or more processors configured to process first data received from a first input device. The first data indicates a first input from a user based on a first input mode, and the first input corresponds to a command. The one or more processors are configured to send a feedback message to an output device based on processing the first data. The feedback message instructs the user to provide, based on a second input mode that is different from the first input mode, a second input that identifies a command associated with the first input. The one or more processors are configured to receive second data from a second input device, the second data indicating the second input, and to update a mapping to associate the first input to the command identified by the second input.

According to another implementation of the present disclosure, a method for multi-modal user input includes processing, at one or more processors of a device, first data received from a first input device. The first data indicates a first input from a user based on a first input mode, and the first input corresponds to a command. The method includes sending, from the one or more processors, a feedback message to an output device based on processing the first data. The feedback message instructs the user to provide, based on a second input mode that is different from the first input mode, a second input that identifies a command associated with the first input. The method includes receiving, at the one or more processors, second data from a second input device. The second data indicates the second input. The method also includes updating, at the one or more processors, a mapping to associate the first input to the command identified by the second input.

According to another implementation of the present disclosure, an apparatus for multi-modal user input includes means for processing first data received from a first input device. The first data indicates a first input from a user based on a first input mode, and the first input corresponds to a command. The apparatus includes means for sending a feedback message to an output device based on processing the first data. The feedback message instructs the user to provide, based on a second input mode that is different from the first input mode, a second input that identifies a command associated with the first input. The apparatus includes means for receiving second data from a second input device, the second data indicating the second input. The apparatus also includes means for updating a mapping to associate the first input to the command identified by the second input.

According to another implementation of the present disclosure, a non-transitory computer-readable medium includes instructions that, when executed by one or more processors of a device, cause the one or more processors to process first data received from a first input device. The first data indicates a first input from a user based on a first input mode, the first input corresponding to a command. The instructions, when executed by the one or more processors, cause the one or more processors to send a feedback message to an output device based on processing the first data. The feedback message instructs the user to provide, based on a second input mode that is different from the first input mode, a second input that identifies a command associated with the first input. The instructions, when executed by the one or more processors, cause the one or more processors to receive second data from a second input device, the second data indicating the second input. The instructions, when executed by the one or more processors, also cause the one or more processors to update a mapping to associate the first input to the command identified by the second input.

V. BRIEF DESCRIPTION OF THE DRAWINGS

VI. DETAILED DESCRIPTION

Figure 1:
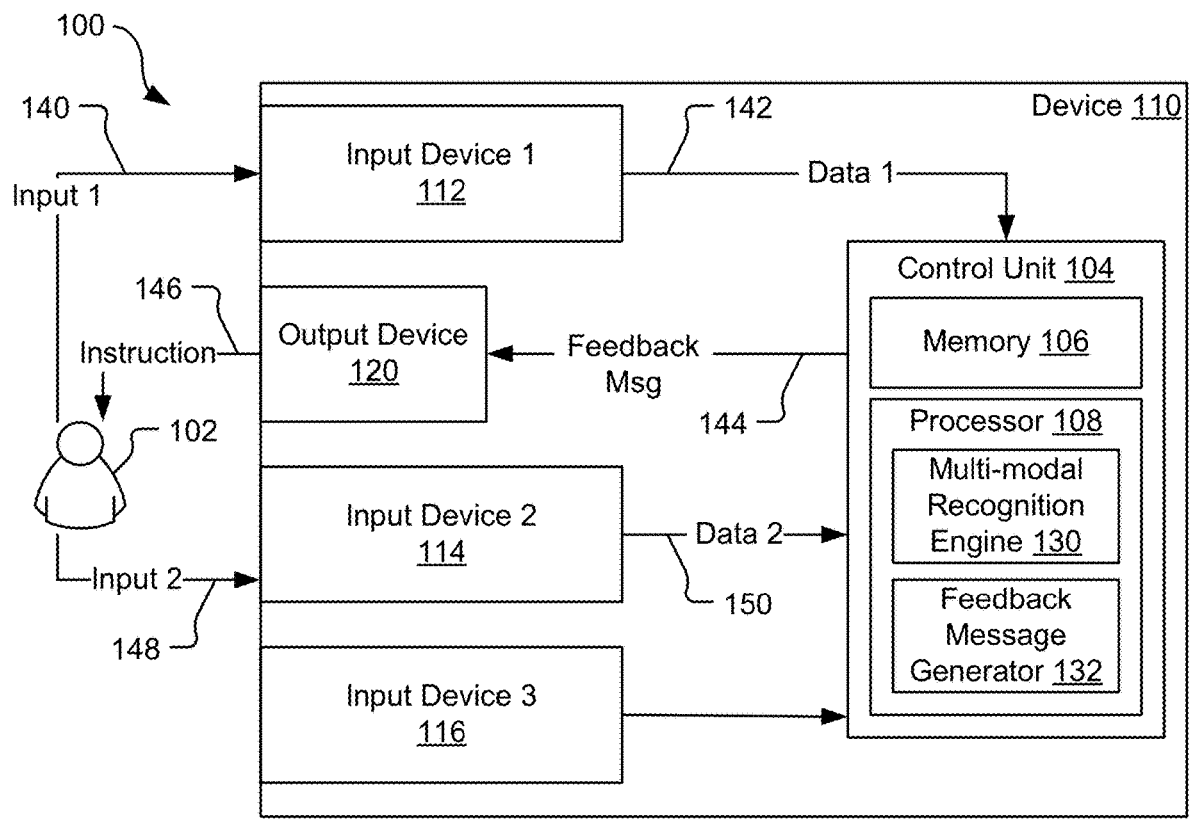
FIG. 1 is a diagram of a particular illustrative implementation of a system including a device operable to process multi-modal user input, in accordance with some examples of the present disclosure.

Devices and methods are described to enable user interaction using multiple input modalities. Many user interfaces are based on automatic speech recognition (ASR) and natural language processing (NLP) and are trained over many different commands, accents, and languages to be useful over a large customer base. Training such user interfaces for broad applicability among a variety of users requires extensive resources, and much of the training to make the user interface generally applicable for a large customer base is "wasted" on a per-user basis because each individual user typically only uses a single language, accent, and sub-set of supported commands.

By enabling multi-modal user interaction, along with the ability to personalize interpretation of user commands, techniques described herein enable multi-modal user interfaces to be trained for use by particular users, reducing or eliminating the extensive training for broad applicability of conventional user interfaces. In some implementations, different embedding networks are used for different input modalities (e.g., an embedding network for speech, an embedding network for visual input, an embedding network for gesture input, etc.) and are configured to distinguish between different commands received using the respective modalities. To illustrate, an "embedding network" can include one or more neural network layers configured (e.g., trained) to process input data, such as speech data (e.g., time-domain speech data or frequency-domain speech data) to generate an embedding vector. An "embedding vector" is a vector (e.g., a set of multiple values) that is relatively low-dimensional as compared to the input data, is representative of the input data, and can be used to distinguish between different instances of input data. The different embedding network outputs are transformed into a common embedding space and fused into a combined embedding vector. For example, an n-dimensional speech embedding vector of a speech input can be transformed into a k-dimensional first embedding vector and an m-dimensional gesture embedding vector of a gesture input can be transformed into a k-dimensional second embedding vector (where m, n, and k may be equal to, or different from, each other). The k-dimensional first embedding vector represents the speech input and the k-dimensional second embedding vector represents the gesture input in a k-dimensional vector space (e.g., a common embedding space). The k-dimensional first embedding vector and the k-dimensional second embedding vector can be combined, such as by vector addition, to generate a combined embedding vector. A classifier interprets the combined embedding vector to generate an output.

Each of the embedding networks and the classifier can be updated (e.g., trained) by individual users to improve recognition of user commands that are received via various modalities. For example, if a spoken user command is received that cannot be interpreted with high confidence, the user interface can query the user as to the meaning of the spoken command, and the user can input the meaning using a different modality, such as by performing a gesture input that is recognized by the user interface.

In some implementations, the user interface can request that the user change input modalities. For example, if a user's spoken command "up," to increase a playback volume, cannot be reliably distinguished from another command (e.g., "off"), the user interface can generate a feedback message (e.g., spoken or displayed) requesting that the user add another modality to better distinguish the command. For example, the user can add a visual input, such as pointing upward for a "increase volume" command. The user interface can be updated to recognize the combination of a spoken input "up" with the pointing upward visual input as a multi-modal command to increase playback volume. Personalized updates (e.g., from single-modal to multi-modal) can therefore be used to improve command recognition accuracy.

In some implementations, the user interface requests that the user change input modalities to more easily disambiguate user inputs. For example, in an implementation in which audio noise impairs interpretation of the user's speech (e.g., in a moving vehicle), the user interface can generate a feedback message requesting that the user change modalities, such as to a visual or gesture modality. As another example, in an implementation in which low light levels impairs interpretation of the user's visual input, the user interface can generate a feedback message requesting that the user change modalities, such as to a speech modality or a gesture modality that uses motion detectors of a wearable electronic device (e.g., a "smart watch") to detect hand movement and orientation. Instructing the user to change input modalities can therefore be used to improve command recognition accuracy.

In some implementations, the user interface requests that the user change input modalities as part of a multi-factor authentication process. For example, after receiving spoken user input to perform voice authentication, the user interface may next request the user provide a visual or gesture input. The request to provide additional user input using another input modality can be triggered by an anomaly in a prior user input, such as detection that the speech input has characteristics indicative of a playback of the user's recorded speech. Alternatively, or in addition, the request can be generated randomly or as part of an established series of authentication inputs for the multi-factor authentication process. Instructing the user to change input modalities can therefore be used for higher accuracy, more robust user authentication. As used herein, user inputs corresponding to authentication inputs for a multi-factor authentication process are distinct from user inputs corresponding to user commands. To illustrate, a user input corresponding to a command is interpreted by the user interface as an instruction to perform an action or "skill" associated with the command (e.g., "turn on the lights"), while a user input corresponding to an authentication input is compared to data of a stored user profile to determine a likelihood that the user input originates from the same user that is associated with the stored user profile (e.g., via comparison of biometric data or other user identification data).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where "A is based on B" includes "based on at least", this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wearable devices, wireless modems, laptop computers, personal computers, etc.

FIG. 1 depicts a system 100 in which a user 102 interacts with a device 110 for multi-modal user input. The device 110 includes a first input device 112, a second input device 114, optionally one or more additional input devices, such as a third input device 116, an output device 120, and a control unit 104. In some implementations, the device 110 can include a portable communication device (e.g., a "smart phone"), a wearable device (e.g., a "smart watch"), a vehicle system (e.g., a movable or removable display for use with an automobile entertainment system, navigation system, or self-driving control system), or a virtual reality or augmented reality headset, as illustrative, non-limiting examples.

The first input device 112 is configured to detect first user inputs based on a first input mode. In an example, the first input device 112 includes a microphone, and the first input mode includes a speech mode (e.g., for ASR/NLP). To illustrate, the first input device 112 can include one or more microphones configured to capture audio input that includes one or more keywords or voice commands.

The second input device 114 is configured to detect second user inputs based on a second input mode. In an example, the second input device 114 includes a camera, and the second input mode includes a video mode (e.g., to detect a visual aspect of the user 102, such as a thumbs-up or thumbs-down hand position, a facial expression, etc.). To illustrate, the second input device 114 can include one or more cameras configured to capture video input that includes one or more gestures or visual commands.

The third input device 116 is configured to detect third user inputs based on a third input mode. In an example, the third input device 116 includes a gesture tracker, and the third input mode includes a gesture mode. The third input device 116 can include one or more antennas configured to receive data indicative of a gesture input (e.g., motion data). To illustrate, the user 102 can wear a bracelet or watch that includes motion sensors (e.g., accelerometers, gyroscopes, etc.) that track movement of the user's hand and transmits the motion data to the third input device 116. In other implementations, motion tracking electronic devices can be integrated with the user 102, such as cybernetic implants in a human user 102, or can be components of the user 102 in implementations in which the user 102 is a robot.

The output device 120 is configured to output information for the user 102, such as via generation of an audible output using a loudspeaker, visual output using a display, via one or more other output modalities (e.g., haptic), or any combination thereof. For example, the output device 120 can receive message data (e.g., a feedback message 144) from the control unit 104 and can generate an output (e.g., an instruction 146) to the user 102, as described further below. In a particular example, the output device 120 includes a display configured to represent a graphical user interface, one or more loudspeakers configured to render or direct the feedback message 144 to the user 102, or a combination thereof.

The control unit 104 is configured to receive data corresponding to user inputs from the input devices 112-116 and to generate feedback messages to be provided to the user 102 via the output device 120. The control unit 104 includes a memory 106 coupled to one or more processors, referred to as processor 108. As described further with reference to FIG. 2, the memory 106 can include data representing one or more embedding networks, data representing one or more transformations of embedding vectors to a combined embedding space, and data representing one or more classifiers, accessible for use by the processor 108. The memory 106 can also include instructions executable by the processor 108 to implement a multi-modal recognition engine 130, a feedback message generator 132, or both.

The processor 108 includes the multi-modal recognition engine 130 and the feedback message generator 132. In some implementations, the processor 108 includes one or more processing cores configured to execute instructions to implement the multi-modal recognition engine 130 and the feedback message generator 132. In some implementations, the processor 108 includes dedicated circuitry configured to implement one or both of the multi-modal recognition engine 130 and the feedback message generator 132. In an example, the processor 108 is implemented as an integrated circuit (IC).

The multi-modal recognition engine 130 is configured to receive data from one or more of the input devices 112-116 and to process the received data to generate an output. For example, the output can include a command that most closely matches the received input and a confidence (or likelihood) indicator associated with the command. In some implementations, the multi-modal recognition engine 130 is configured to generate data to distinguish, for each input modality, a particular trained user input from the other trained user inputs, such as by generating an embedding vector for each input modality. The multi-modal recognition engine 130 can be configured to combine embedding vectors associated with the different input modalities to generate a combined embedding vector that indicates which recognized user input (if any) is detected via each of the input devices 112-116 as part of a uni-modal or multi-modal user input. The combined embedding vector is processed to determine an output, such as by using a classifier trained to map combined embedding vectors to commands. An illustrative example of components that can be implemented in the multi-modal recognition engine 130 is described with reference to FIG. 2.

The feedback message generator 132 is configured to generate feedback message data to be output to the user 102 via the output device 120. For example, the feedback message generator 132 can send a feedback message 144 to the output device 120 to instruct the user 102 to repeat a user input that was not adequately recognized, such as predicted to be a particular command with a confidence level below a threshold. As other examples, the feedback message generator 132 can send the feedback message 144 to the output device 120 to instruct the user 102 to change input modalities or to augment an input made using one input modality with another input made using a different input modality. Other examples include generating feedback message data that provides recorded samples of user input for the user 102 to emulate, recorded samples of the user's input for the user 102 to identify, or other information to assist the user 102 with using the device 110. Illustrative examples include cross-modal sample retrieval, such as displaying a motion video showing a motion corresponding to "UP" in response to receiving a query from the user 102, generating an audio playback of the most similar utterance associated with the motion of an UP gesture, or generating an audio playback of a related utterance already associated closely with a user defined motion. In some examples, the feedback message generator 132 is configured to generate the feedback message 144 to instruct the user 102 to provide a next authentication input in accordance with a multi-factor authentication process, as described in more detail below.

During operation, the user 102 provides a first input 140 based on the first input mode (e.g., a verbal command) that is detected by the first input device 112. The first input device 112 generates first data 142 indicative of the first input 140 and provides the first data 142 to the control unit 104.

The processor 108 (e.g., the multi-modal recognition engine 130) processes the first data 142 indicating the first input 140 from the user 102 that is based on the first input mode (e.g., speech). The processor 108 (e.g., the feedback message generator 132) sends a feedback message 144 to the output device 120 based on the processing of the first data 142. The feedback message 144 instructs the user 102, e.g., via playout of a spoken instruction 146, to provide, using a different input mode, a second input 148. The second input 148 is based on a second input mode (e.g., video) that is different from the first input mode and can be used to update how the multi-modal recognition engine 130 responds to the first input 140. As used herein, using a different input mode means using a different type of input, rather than using the same type of input. Each different type of input uses a range of different sensors. For example, a speech input mode may use one or more microphones. A gesture input mode may use motion detection. A video input mode may use a camera and sequence of frames. In general, each input mode provides different types of sensors that may be used to provide the input.

In some implementations, the first input 140 is a command, and the feedback message 144 instructs the user 102 to provide the second input 148 to disambiguate the first input 140. The multi-modal recognition engine 130 may send the feedback message 144 in response to a confidence level associated with recognition processing of the first input 140 failing to satisfy a confidence threshold, indicating uncertainty in an output (e.g., uncertainty of whether a spoken input indicates "up" or "off"). The user 102 may provide the second input 148 (e.g., pointing upward), and based on second data 150 that indicates the second input 148, the multi-modal recognition engine 130 can update a mapping of the first input 140 (e.g., the speech "up") to an action (e.g., increase a music volume) that is associated with the second input 148, such as described in further detail in FIG. 2.

In another implementation, the multi-modal recognition engine 130 updates a mapping of the first input 140 combined with the second input 148 to an action associated with the second input 148. For example, when noise conditions prevent reliable recognition of a spoken "up" command, the multi-modal recognition engine 130 is updated to recognize the user's "up" video input (e.g., pointing up) in conjunction with the user's spoken "up" command, as single command to turn the volume up.

Thus, in some implementations, the user 102 can personalize the device 110 to recognize specific inputs as commands to perform specific actions via the feedback mechanism of the feedback message 144 and the second input 148. To illustrate, the user 102 can speak a command (the first input 140) that is not currently recognized by the multi-modal recognition engine 130 and, in response to the feedback message 144, the user 102 can identify the action to be mapped to the unrecognized command by entering a recognized command (the second input 148). Similarly, the device 110 can instruct the user 102 to change modes of input when the user's chosen mode has become unreliable. For example, when the device 110 is implemented in a vehicle (e.g., a car navigation and/or entertainment system), during nighttime driving the user 102 may be instructed to use a speech input or gesture input instead of video (due to low light conditions), and when driving with a window open the user 102 may be instructed to use a gesture input or a video input instead of speech (due to high wind noise). Similar operations may be performed to instruct the user 102 to change input modes when the device 110 is implemented in a headset, such as a virtual reality or an augmented reality headset.

In other implementations, the device 110 is used to perform multi-factor authentication. For example, the first input 140 may correspond to a first authentication action of the user 102 (e.g., spoken passcode for speaker verification), and the feedback message 144 instructs the user 102 to provide the second input 148 (e.g., display a particular hand configuration previously selected by the user 102) as a second authentication action as part of a multi-factor authentication procedure. The device 110 can randomly or algorithmically select a number and type of authentication input modes for instructing the user 102 to perform authentication actions. For example, the device 110 can generate the instruction 146 responsive to an indication that a speech input (e.g., the first input 140) may be recorded speech being played out, and may request a "liveliness" confirmation, such as by instructing the user 102 to wink at the camera (e.g., the second input device 114).

Although the above examples describe that the second input 148 uses a different mode from the first input 140, in other implementations the second input 148 can use the same mode as the first input 140. For example, although a spoken command of the first input 140 may be difficult to interpret (e.g., "up" vs. "off," in the presence of ambient noise), another spoken command (e.g., "louder") may be sufficiently distinct from other mapped commands to select the correct action (e.g., increase volume). As another example, during a training process, the user 102 may utter "louder" as an untrained speech command, and the device 110 may instruct the user 102 via the instruction 146 to identify an action to be associated with the utterance "louder." The user 102 may provide a second spoken utterance "up" that is recognized by the device 110 as a command to increase volume, and the multi-modal recognition engine 130 may update a mapping of user inputs to map "louder" with an "increase volume" action.

Figure 2:
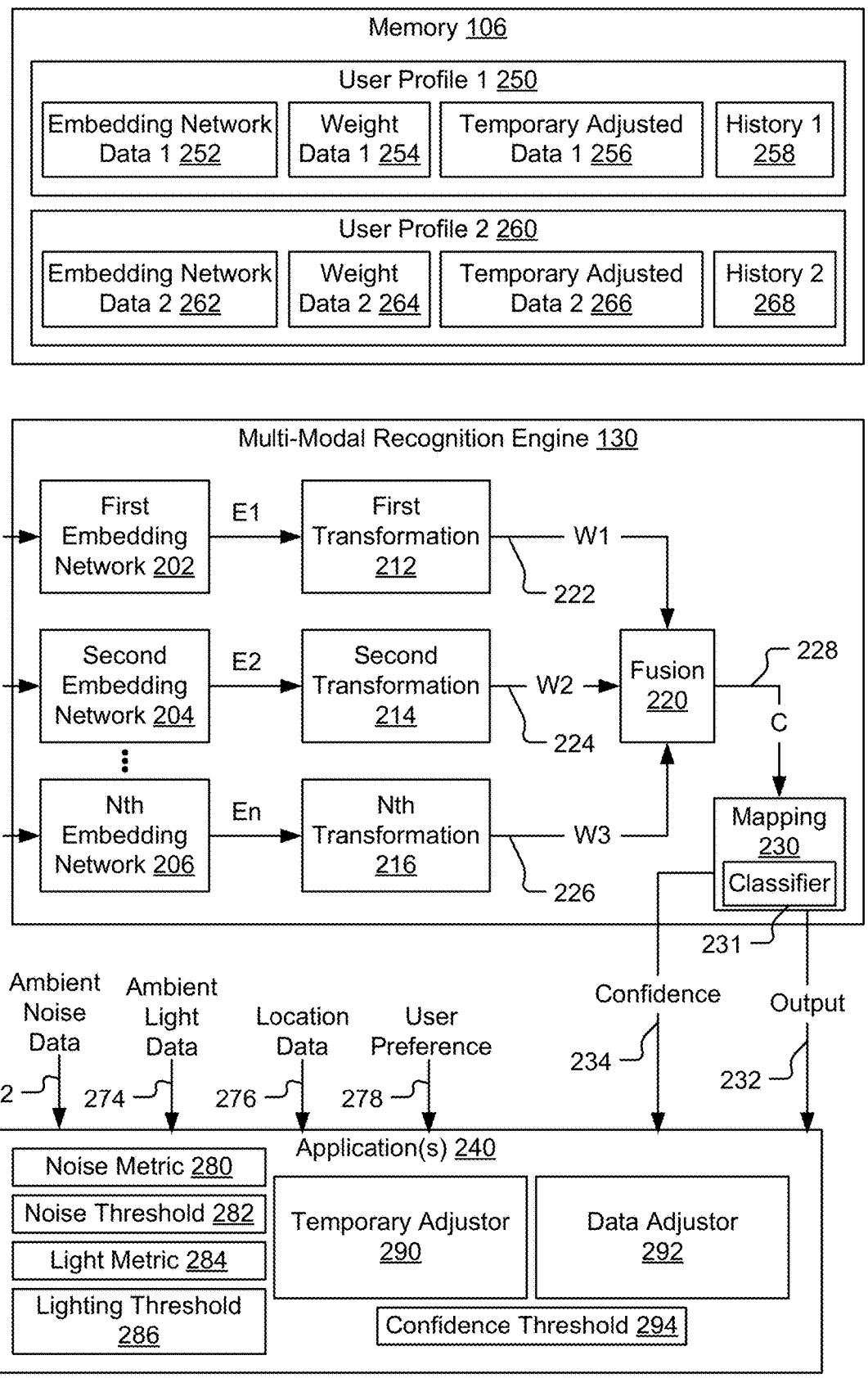
FIG. 2 is a diagram of a particular implementation of components of the device of FIG. 1, in accordance with some examples of the present disclosure.

FIG. 2 illustrates an example of components of the control unit 104 including the memory 106, the multi-modal recognition engine 130, and one or more applications 240 that are executable by the processor 108, in accordance with a particular implementation. The multi-modal recognition engine 130 includes a first embedding network 202 configured to convert first user inputs (e.g., speech inputs) into first embedding vectors (e.g., a first embedding vector "E1"). A second embedding network 204 is configured to convert second user inputs (e.g., gesture inputs) into second embedding vectors (e.g., a second embedding vector "E2"). The multi-modal recognition engine 130 may include one or more additional embedding networks, including an Nth embedding network 206 configured to convert Nth user inputs (e.g., video inputs) into Nth embedding vectors (e.g., an Nth embedding vector "En"). The multi-modal recognition engine 130 may include any number of embedding networks in accordance with some embodiments of the present disclosure.

A fusion embedding network 220 is configured to combine outputs of the embedding networks 202-206 and generate combined embedding vectors, such as a combined embedding vector "C" 228. For example, a first transformation 212 can convert a speech embedding vector to a "common" embedding space to generate a first common embedding vector 222. A second transformation 214 can convert a gesture embedding vector to the common embedding space to generate a second common embedding vector 224, and a Nth transformation 216 can convert a video embedding vector to the common embedding space to generate a Nth common embedding vector 226. Each of the common embedding vectors 222-226 can be weighted with a corresponding weight W1, W2, and W3, respectively, and combined at the fusion embedding network 220. A mapping 230 is configured to select an output 232 and a confidence level 234 that correspond to the combined embedding vector 228. For example, the mapping 230 can include a classifier 231 configured to map the combined embedding vectors to particular actions. To illustrate, a single classifier 231 is used to determine the output 232 resulting from the combined inputs to the multiple embedding networks 202-206, rather than using individual classifiers for each modality input.

Data indicative of one or more parameters used by the multi-modal recognition engine 130 is stored in the memory 106. A first user profile 250 is associated with a first user (e.g., the user 102) and includes first embedding network data 252, first weight data 254, first temporary adjusted data 256, and first history data 258. The first embedding network data 252 includes data (e.g., weights or other parameters or values) to configure the embedding networks, including the first embedding network 202, the second embedding network 204, the Nth embedding network 206, and the fusion embedding network 220, to correspond to the first user. The first weight data 254 includes weight values to configure the weights (e.g., W1, W2, W3) to correspond to the first user. The first temporary adjusted data 256 includes values to adjust a configuration of the multi-modal recognition engine 130 based on temporary conditions (e.g., to reduce the weight W1 and increase the weights W2 and W3 in noisy environments), as described further below. The first history data 258 includes historical data associated with the first user and enables the processor 108 to update the first embedding network data 252, the first weight data 254, or both, based on historical trends corresponding to multi-modal inputs of the first user processed by the multi-modal recognition engine 130.

Similarly, the memory 106 includes a second user profile 260 associated with a second user and including second embedding network data 262, second weight data 264, second temporary adjusted data 266, and second history data 258 for the second user. The first embedding network data 252 differs from the second embedding network data 262 based on input command differences between the first user and the second user. For example, the first user and the second user may have different accents, different styles of gesturing, different body mechanics when performing video input, or any combination thereof. The first embedding network data 252 may represent results of training the embedding networks 202-206 and 220 to recognize user-specific variations from a default set of embedding network data for the first user, and the second embedding network data 262 may represent results of training the embedding networks 202-206 and 220 to recognize user-specific variations from the default set of embedding network data for the second user. Although only two user profiles 250, 260 are illustrated, any number of user profiles can be included to customize operation of the multi-modal recognition engine 130 for multiple users of the device 110.

In addition to adjusting for individual user variations, such as for different accents, gesture styles, and body mechanics, the first embedding network data 252 may also represent results of training the embedding networks 202-206 and 220 to recognize a first customized set of user inputs determined by the first user, and the second embedding network data 262 may also represent results of training the embedding networks 202-206 and 220 to recognize a second customized set of user inputs determined by the second user. For example, the first user may customize (e.g., train) the multi-modal recognition engine 130 to recognize the speech command "up" as a command to increase the volume while an audio playback operation is ongoing. In contrast, the second user may customize (e.g., train) the multi-modal recognition engine 130 to recognize the speech command "up" as a command to select a previous audio track on a playlist while an audio playback operation is ongoing.

The first weight data 254 may differ from the second weight data 264 based on input mode reliability differences between the first user and the second user. For example, the processor 108 may determine, such as based on the first history data 258, that speech inputs from the first user are less reliably interpreted as compared to gesture inputs from the first user. As a result, the weight W1 may be reduced from a default W1 value, and the weight W2 may be increased from a default W2 value in the first weight data 254 to reduce reliance on speech inputs and to increase reliance on gesture inputs from the first user. In contrast, the processor 108 may determine, such as based on the second history data 268, that speech inputs from the second user are more reliable as compared to gesture inputs from the second user. As a result, the weight W1 may be increased from the default W1 value and the weight W2 may be decreased from the default W2 value in the second weight data 264 to reduce reliance on gesture inputs and to increase reliance on speech inputs from the second user.

The applications 240 include a temporary adjustor 290 and a data adjustor 292. The temporary adjustor 290 is configured to determine adjustments of one or more of the embedding networks 202, 204, 206, or 220, adjustments of one or more of the weights W1-W3, or a combination thereof, based on temporary conditions. For example, the temporary adjustor 290 can adjust one or more of the weights W1-W3 to emphasize one or more input modalities, to de-emphasize one or more input modalities, or a combination thereof, based on detected conditions. As illustrative, non-limiting examples, the detected conditions can be indicated by one or more of ambient noise data 272, ambient light data 274, location data 276, or a user preference 278, as described in further detail below.

The data adjustor 292 is configured to determine adjustments of one or more of the embedding networks 202, 204, 206, or 220, adjustments of one or more of the weights W1-W3, or a combination thereof, to update embedding network data and weight data to represent changes that are determined to not be based on temporary conditions. In some implementations, the data adjustor 292 is configured to perform update training to one or more of the embedded networks 202, 204, 206, or 220 to indicate updated mappings of user inputs to specific commands, such as in response to receiving disambiguation feedback from a user that helps the multi-modal recognition engine 130 to more accurately recognize a user input (e.g., to adapt to differences between the user's pronunciation of spoken command and a default speech recognition model) or in response to user input indicating a custom mapping of an input to a particular command (e.g., the user inputs a "thumbs-up" gesture with both hands as a previously-unknown video input and indicates that this video input should cause the device 110 to turn off an alarm).

In an illustrative example of operation of the multi-modal recognition engine 130 implemented in the system 100 of FIG. 1, the user 102 is identified as a source of multi-modal input to the device 110, such as via face recognition, voice recognition, or some other form of user recognition. The embedding networks 202-206 are updated based on the first embedding network data 252, the weights W1, W2, and W3 are updated based on the first weight data 254, and any temporary adjustments are applied based on the first temporary adjusted data 256, to configure (e.g., customize) the multi-modal recognition engine 130 to recognize inputs from the user 102.

The user 102 provides the first input 140 as a command. The first input 140 is not recognized as any particular command with sufficient reliability, and the feedback message 144 instructs the user 102 to provide the second input 148 to disambiguate the first input 140. For example, the feedback message 144 may be sent in response to a confidence level 234 associated with recognition processing of the first input 140 failing to satisfy a confidence threshold 294, indicating uncertainty in the output 232 (e.g., uncertainty of whether a spoken input indicates "up" or "off."). In other implementations, the feedback message 144 is sent in response to one or more environmental conditions being detected.

For example, in an implementation in which the first input 140 is received via the video mode, the feedback message 144 is sent in response to an ambient light metric 284 having a value below a lighting threshold 286. For example, ambient light data 274 can be received via one or more sensors of the device 110 and processed to generate the ambient light metric 284. The ambient light metric 284 can be compared to the lighting threshold 286 to determine whether the ambient lighting is too dim for reliable video mode inputs. The feedback message 144 may inform the user that the dim lighting is causing the video input mode to be unreliable and may instruct the user to repeat the input using another modality (e.g., speech).

As another example, in an implementation in which the first input 140 is received via the speech mode, the feedback message 144 is sent in response to a noise metric 280 (e.g., a signal-to-noise ratio (SNR) or an ambient noise measurement) having a value above a noise threshold 282. For example, ambient noise data 272 can be received via one or more sensors of the device 110 (or measured during voice activity detection processing of a microphone input signal) and processed to generate the noise metric 280. The noise metric 280 can be compared to the noise threshold 282 to determine whether the ambient noise is too loud for reliable speech mode inputs. The feedback message 144 may inform the user that the noise environment is causing the speech input mode to be unreliable and may instruct the user to repeat the input using another modality (e.g., video).

The user 102 may provide the second input 148 (e.g., pointing upward), and based on the second data 150 that indicates the second input 148, the multi-modal recognition engine 130 can update a mapping of the first input 140 (e.g., the speech "up") to an action (e.g., increase a music volume) that is associated with the second input 148. To illustrate, one or more of the first embedding network 202, the first transformation 212, the weight W1, the fusion embedding network 220, or the mapping 230 can be adjusted by the data adjustor 292 to cause the multi-modal recognition engine 130 to more accurately recognize the user's spoken "up" as a command to increase the music volume.

In an illustrative example of operation, if one input modality is determined to have a low-accuracy condition, the multi-modal recognition engine 130 (e.g., responsive to temporary adjusted data generated by the temporary adjustor 290) adjusts one or more settings to reduce or eliminate the effect of inputs using that modality for generation of the combined embedding vector 228. In an example in which the speech modality is determined, predicted or estimated to be unreliable (e.g., due to the noise metric 280 exceeding the noise threshold 282), while the gesture and video modalities are determined to be sufficiently reliable for input recognition, the temporary adjustor 290 may set the weight W1 applied to the common embedding vector 222 associated with speech inputs to a "0" value. The weight W2 applied to the common embedding vector 224 associated with gesture inputs and the weight W3 applied to the common embedding vector 226 associated with video inputs are set to non-zero values (e.g., W2=W3=0.5, in an implementation in which the gestures and video inputs are treated as equally reliable). Setting the weight W1 to the "0" value prevents a speech input from having an effect on the resulting combined embedding vector 228 while the speech input remains unreliable.

In accordance with the above example, an initial setting of the weights may assign W1=W2=W3=⅓, indicating that each modality has an equal importance or reliability for input recognition. The speech modality may later be determined or predicted to be unreliable, such as due to detection of a large amount of ambient noise (e.g., via detection that the noise metric 280 exceeds the noise threshold 282 or detection that a vehicle window is open while the vehicle is in motion) or due to a threshold number of speech inputs failing to be accurately recognized in a predetermined time period. In response to the speech modality being determined or predicted to be unreliable, the temporary adjustor 290 adjusts the weights W1, W2, and W3 to 0, ½, and ½, respectively, to remove the effect of speech inputs on input recognition. In response to a subsequent determination that the speech input modality is no longer unreliable (e.g., the wind noise falls below the noise threshold, the window is closed, or the vehicle has stopped moving), the weights W1, W2, and W3 may each be returned to their initial value of ⅓.

As another example, the video modality may instead be determined or predicted to be unreliable, such as due to detection of a low amount of ambient light (e.g., the ambient light metric 284 is below the lighting threshold 286) or due to a threshold number of video inputs failing to be accurately recognized in a predetermined time period. In response to the video modality being determined or predicted to be unreliable, the temporary adjustor 290 adjusts the weights W1, W2, and W3 to ½, ½, and 0, respectively, to remove the effect of video inputs on input recognition. In response to a subsequent determination that the video input modality is no longer unreliable (e.g., ambient light is determined to exceed a lighting threshold), the weights W1, W2, and W3 may each be returned to their initial value of ⅓.

In some implementations, multiple weights are adjusted to reduce or remove the impact of multiple input modalities on input recognition. For example, in an implementation in which a determination is made that only the speech modality is to be used, W1 is set to "1" and W2 and W3 are set to "0." To illustrate, the device 110 may detect a low ambient light condition and may also determine that no active gesture detection device is detected (e.g., the user's smart watch is not present or not transmitting motion data). As another example, the user 102 may instruct the device 110, such as via inputting a user preference 278, to restrict input recognition to process only speech inputs. As another example, location data 276 may be used to determine whether to restrict one or more input modalities. For example, in response to the location data 276 indicating that the user is operating a vehicle, the temporary adjustor 290 may restrict user input modes to prevent recognition of gesture inputs and video inputs, such as to prevent user distraction and to encourage safe operation of the vehicle. In response to the location data 276 indicating that the user is no longer operating the vehicle and is in the user's home, the temporary adjustor 290 may restore user input modes to enable recognition of gesture inputs and video inputs.

Although examples of weight values are described in the above examples, such example weight values are illustrative and not limiting. To illustrate, rather than setting a weight to "0," the weight may be set to a reduced value to diminish but not eliminate the effect of the associated input modality on overall input recognition. As another example, "reliable" input modalities may have unequal weights that may be indicative of relative reliability of the input modalities. To illustrate, if gesture input is considered sufficiently reliable, video input is considered more reliable than gesture input, and speech is determined to be unreliable, the weights may be set to values such as W1=0.1, W2=0.4, and W3=0.5. Although in the above examples the sum of the weights W1, W2, and W3 equals 1, in other implementations the sum of the weights W1, W2, and W3 is not restricted to any particular value.

In addition, or as an alternative, to adjusting one or more weights to reduce or eliminate the influence of an input modality that is determined to be unreliable, in some implementations the multi-modal recognition engine 130 may force the output of the associated embedding network to a "None" output from among available skills, force the output of the transformation to the common embedding space for the "None" category input to an embedding vector having a "0" value, or a combination thereof.

In some implementations, device 110 including the multi-modal recognition engine 130 performs environment-aware fusion of multiple input modalities. For example, in response to determining that the user 102 is driving a car, the weight W2 associated with gesture inputs may be set to "0," indicating that a user's hand motions are likely to correspond to car operation rather than as gesture inputs, to discourage unsafe hand motions while driving the car. As another example, in response to determining that the user 102 is in a dark room, the weight W3 associated with video inputs may be set to "0." As another example, in response to determining that the user 102 is in a noisy environment, the weight W1 associated with speech inputs may be set to "0." Determination of environmental conditions can be based on one or more sensors integrated in the device 110 (e.g., ambient light sensor(s), ambient noise sensor(s)), one or more sensors external to the device 110 (e.g., via communication between the device 110 and one or more components of a home automation system, an internet-of-things system, or another system), or any combination thereof.

Figure 3:
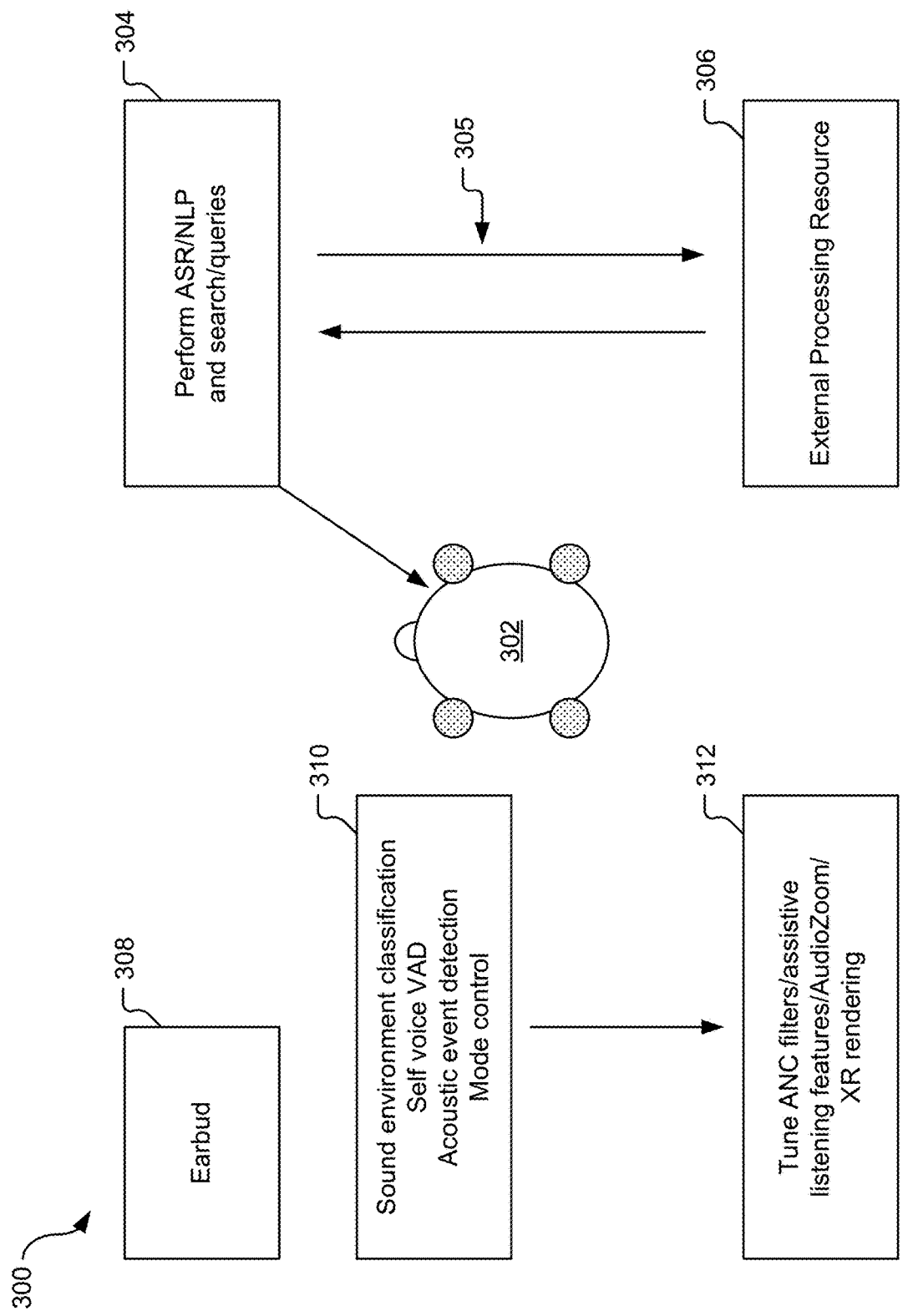
FIG. 3 is a diagram of another particular implementation of a system including a device operable to process multi-modal user input, in accordance with some examples of the present disclosure.

FIG. 3 depicts an example of a system 300 for multi-modal user input in which a user wearing a headset 302 is in communication with another device such as a smart phone, a vehicle system such as a car, or a speaker system that incorporates a wireless digital assistant application (e.g., a "smart speaker"). The headset 302 can correspond to the device 110 of FIG. 1 and can include a display and a transducer, such as an earbud 308 or other wearable noise generation device, to provide augmented reality ("AR"), virtual reality ("VR"), or mixed reality ("MR") audio and video output to a wearer.

The headset 302 can include multiple sensors, such as one or more microphones, one or more cameras, etc., to detect user input. For example, audio input received via one or more microphones can be used to perform one or more operations 310 at a processor integrated in or coupled to the headset 302. For example, processing an audio signal corresponding to the audio input, such as using machine learning, to enable sound environment classification, self-voice voice activity detection (VAD) to determine when a wearer of the headset 302 is speaking, acoustic event detection, and mode control (e.g., sequence-based user interface) can be performed.

Results of the one or more operations 310 can be used to generate one or more actions 312. For example, the actions 312 can include tuning active noise cancellation (ANC) filters, implementing one or more assistive listening features, adjusting a field of multi-microphone sound capture (e.g., "AudioZoom"), or performing augmented reality rendering, virtual reality rendering, or mixed reality rendering (collectively referred to as "XR" rendering). For example, results may be rendered at the headset 302 in a spatial transparent mode.

User input detected at the headset 302 (e.g., via one or more microphones, motion detectors, gesture detectors, cameras, etc.) may be used to initiate performance of one or more speech-based operations 304, such as automatic speech recognition and natural language processing, search or query responses, or both. The one or more speech-based operations 304 can be performed using machine learning, such as at a smart phone or other portable communication device in communication with the headset 302. Data communication 305 (e.g., wireless network communication, wireline communication, or both) may include sending audio speech data to an external processing resource 306 (e.g., cloud-based ASR/NLP and search servers that incorporate machine learning). Search and query results can be communicated back to the user via the headset 302.

Figure 4:
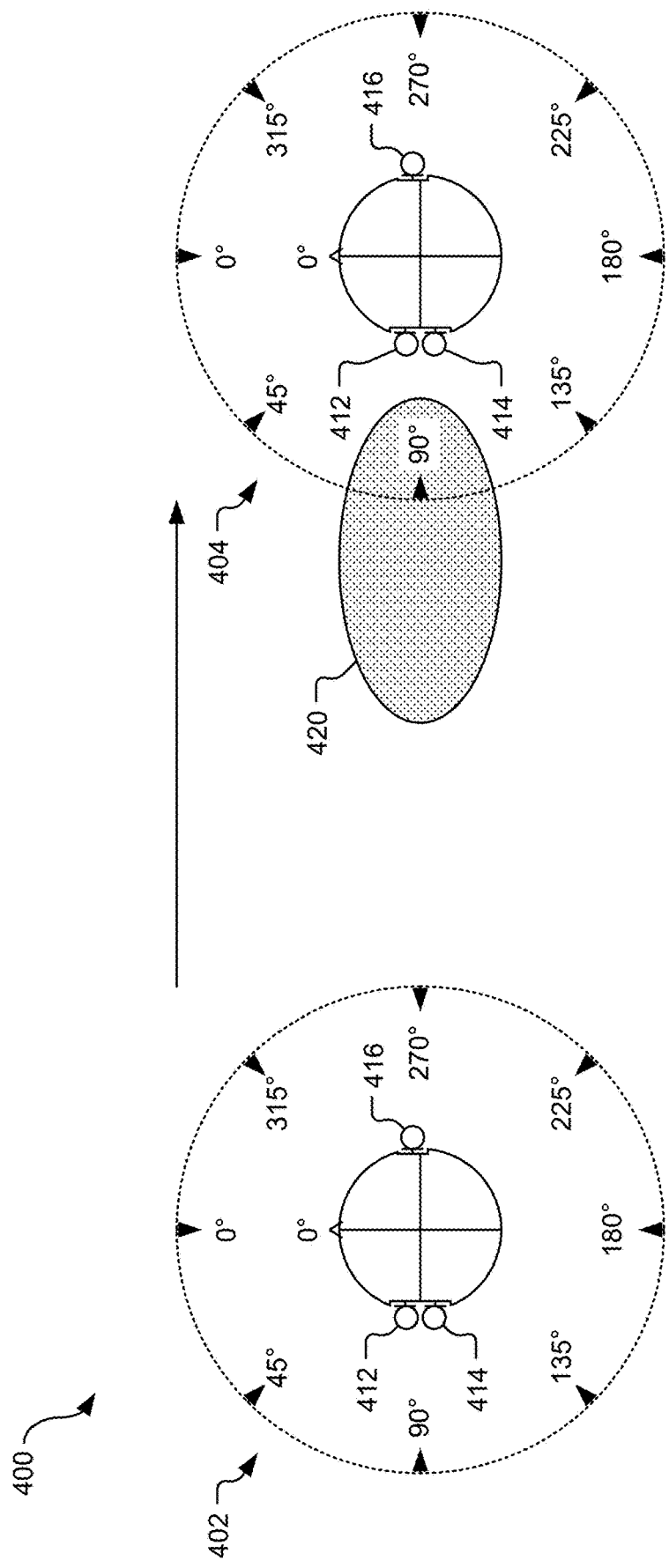
FIG. 4 is a diagram of an example of another particular implementation of a system including a device operable to process multi-modal user input, in accordance with some examples of the present disclosure.

FIG. 4 depicts an example 400 of adjusting a field of multi-microphone sound capture (e.g., "AudioZoom"), such as may be performed by the headset 302 of FIG. 3 in an illustrative, non-limiting example. Multiple microphones, such as representative microphones 412, 414, and 416, are arranged about a user. The user is illustrated as centered in a polar coordinate system and oriented to face a 0-degree angular direction. The microphones 412, 414, and 416 can include directional microphones, non-directional microphones, or both, and capture an audio environment surrounding the user. In a first configuration 402, sound processing of audio from the microphones 412-416 results in an audible output to the user (e.g., via earphones or earbuds) that represents the audio environment without user-directed adjustment.

In a second configuration 404, in response to a user input via a multi-modal interface (e.g., a user gesture, utterance, video input, or a combination thereof, as illustrative examples), sound processing of audio from the microphones 412-416 is adjusted to emphasize (e.g., amplify) sounds originating or arriving from a particular spatial region 420 (e.g., a region at 90-degree angular direction, or to the user's left), while attenuating sounds originating from areas outside the spatial region 420. Examples of user input that results in transitioning to the second configuration 404 can include a "zoom left" speech sequence based on a speech modality, a "point hand to the left" or "point finger to the left" gesture sequence based on a gesture modality, or a "make a snapping sound" audio sequence based on an audio (non-speech) modality, as illustrative, non-limiting examples.

In some implementations, the multi-modal interface as described above with reference to FIGS. 1-4 is responsive to context, such as a location or activity in the proximity of the user (e.g., watching television in the living room, or washing dishes in the kitchen). For example, gestures that are captured using a watch or armband-based accelerometer can be interpreted based on the detected context. For example, waving a hand can be interpreted as the targeted command "light on," flipping a hand to the left can be interpreted as "next song" or "next channel," flipping a hand to the right can be interpreted as "previous song," "previous channel," or "door open." A "grab" gesture in which a closed first is formed can be interpreted as "pick call" or "select channel," a long grab can be interpreted as "stop song," "cancel alarm," or "door close," and a counter-clockwise rotation of the hand with fingers extended can be interpreted as "discover home devices," as illustrative, non-limiting examples. Context can be determined via association with detected acoustic event/environment sequences. For example, various acoustic events can be detected to infer an acoustic environment (e.g., where is the user) or to monitor for appropriate feedback timing. Examples of such detectable acoustic events include: hair dryer, vacuum, music, kitchen hood, cooking, eating, dish washing, indoor air conditioning, microwave oven, washer, dryer, shower, and watching television.

A dataset for hand gesture recognition can include: three-dimensional (3-D) accelerometer and gyroscope sensor data (e.g., along x, y & z axis) indicative of hand movement. Each component of sensor signals (e.g., from accelerometer and gyroscope) can be in fixed-width windows, such as windows of 3 seconds (e.g., 150 readings/windows). Multiple gesture classes can be implemented, such as: Next, Previous, Up/Increase, Down/Decrease, On, Off, and Unknown, as illustrative, non-limiting examples. One or more data augmentation techniques can be implemented, such as Permutation, Time-warping, Scaling, Magnitude-warping, Jitters, and Cropping.

Feature extraction can be performed, such as based on statistical features of a dataset for hand gesture recognition. To illustrate, extracted features can correspond to Min, Max, Var, Mean, Standard Deviation, MSE (Minimum Squared Error), ACF (Auto-correlation), ACV (Auto-covariance), Skewness, Kurtosis, Mean Crossing rate, Jitters, or 3-Quantiles, as illustrative, non-limiting examples.

One or more models can be used for hand gesture recognition, such as support vector machine (SVM), gradient boosting, classifier, stacked long short-term memory recurrent neural networks (LSTM-RNN), sequence-to-sequence encoder-decoder models with attention, one or more other models, or any combination thereof.

In some aspects, the multi-modal recognition engine 130 can learn or train to generate sequence embedding vectors directly mapped to target actions. Examples of input sequences include accelerometer or gyroscope time series (e.g., for gesture inputs), speech command time series, or audio time series. An encoder-decoder LSTM-RNN with attention can be used to learn to generate embedding vectors that represent variable length time series signals as fixed length and discriminating vectors, such as to generate an output to a softmax layer to indicate a target action class associated with the input sequence.

In some aspects, the multi-modal recognition engine 130 can use embedding vectors for enrollment and design of different action classes. For example, a number of different input sequences can be enrolled, and one or more classifiers can be designed using embedding vectors mapped to each target action. For example, a SVM, K-means, k-nearest neighbors (KNN), cosine (cos) distance, or other design can be implemented to map the embeddings to the target actions. Testing of user sequences can be performed to verify accuracy of the updated system.

In some aspects, after enrollment and SVM/K-means/KNN design, the metrics associated with classifier evaluation show that separation between classes is too ambiguous and sequence shaping may be performed. In such cases, the feedback message generator 132 can generate feedback to indicate to the user certain problematic sequences that cause confusion with other classes. For example, the motion, audio, or speech sequences of confused classes can be played back to the user, such as via the output device 120. The user can realize which sequences cause confusion and can utter/gesture back new sequences to improve separation between target classes and provide disambiguation. Alternatively, confusing input sequences can be matched by the user, via the multi-modal user interface, to the same action/class so that ambiguity between the input sequences is rendered moot. After receiving the user feedback, the multi-modal recognition engine 130 can re-enroll and revise the SVM/K-means/KNN designs, and the feedback message generator 132 can re-prompt the user to repeat the input sequences in case of confusion, until sequence mappings become sufficiently distinct from each other. For example, a "confusion matrix" can represent an amount of ambiguity between different sequences, and training can be repeated until the confusion matrix is quasi diagonal.

In some aspects, sequence shaping with multi-modal input can be performed in response to detecting "problematic" input sequences that cause confusion with other action classes. The device 110 can request to a user whether the user wishes to use multi-modal input for each of the problematic input sequences. For example, if the user's particular gestures for "off" and "volume down" are difficult for the multi-modal recognition engine 130 to distinguish, the output device 120 may output a query to the user, "Do you want to use the verbal command 'turn off' for the 'off' category?" As another example, the output device 120 may output the query, "Do you want to use the verbal command 'decrease volume' for the 'volume down' category?" In response to the user selecting to use multi-modal inputs (e.g., to add verbal commands due to gesture confusion), multi-modal cues can be activated, and the device 110 can adjust a confusion matrix to include probabilities of confusion using the multi-modal input sequences.

In some aspects, interactive sequential verification can be used to disambiguate input sequences. For example, a user may forget which categories are registered with which multi-modal inputs. A dialogue-based interaction between the user and the device 110 may be conducted. For example, if a gesture input is detected as "off" category, the output device 120 may query the user, "Do you mean 'off' category or 'next' category?" The user may answer "off," and the multi-modal recognition engine 130 may activate the "off" command.

Figure 5:
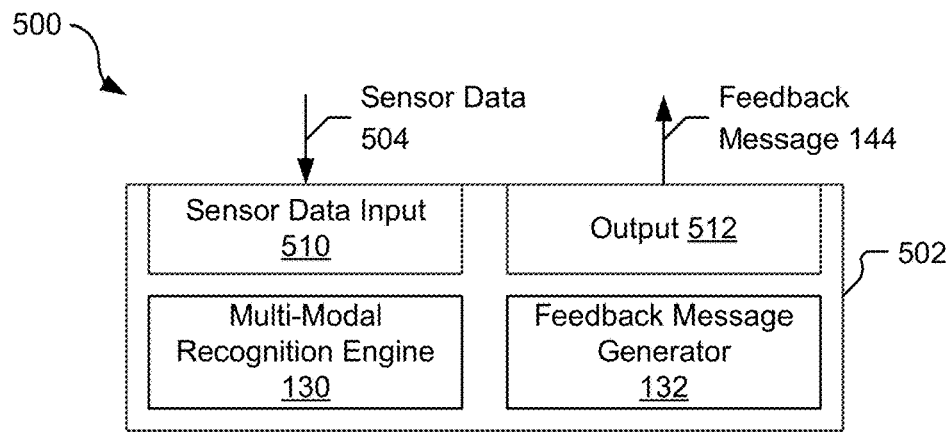
FIG. 5 is a diagram of another implementation of a device operable to process multi-modal user input, in accordance with some examples of the present disclosure.
Figure 11:
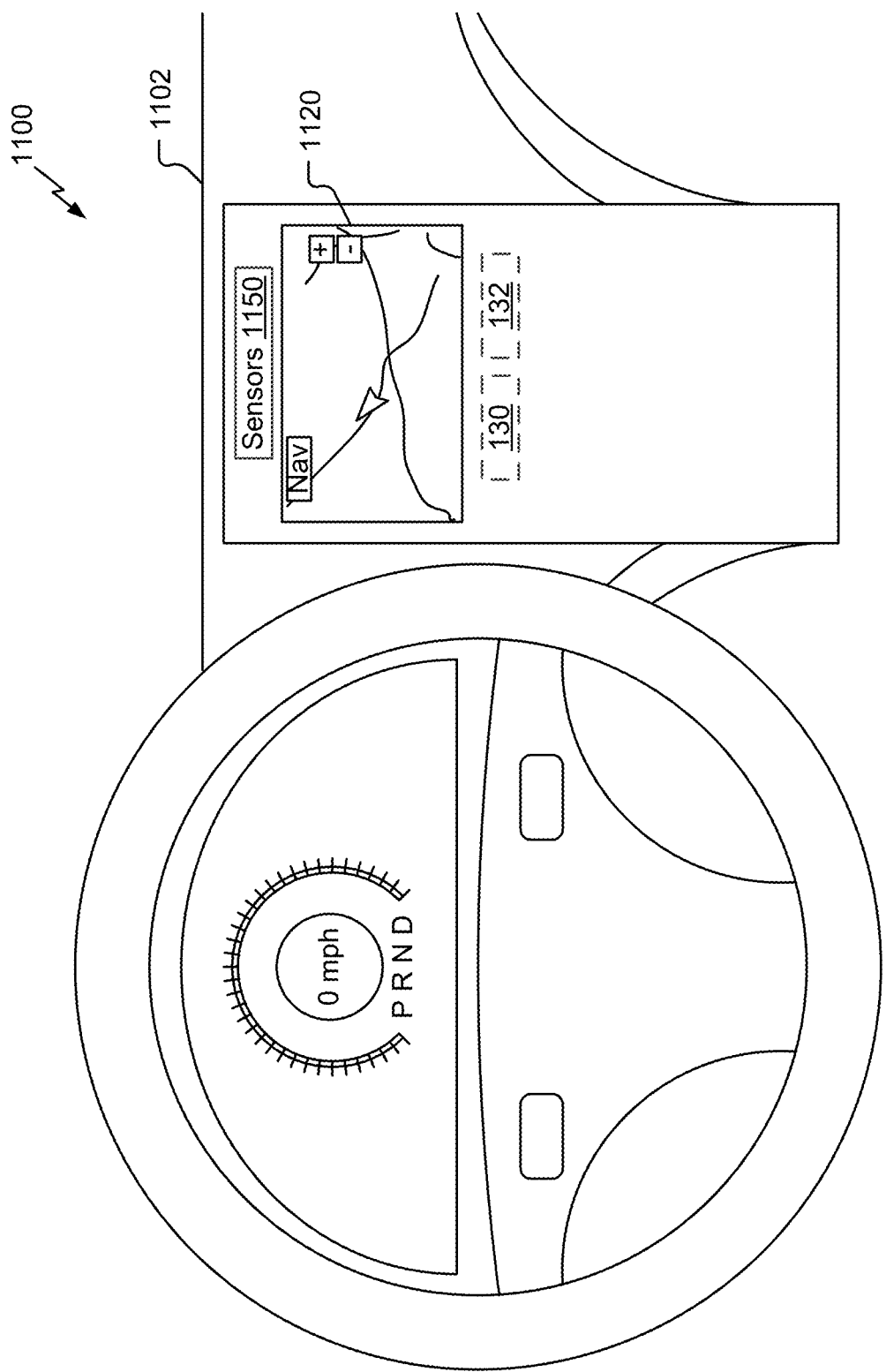
FIG. 11 is a diagram of a vehicle operable to process multi-modal user input, in accordance with some examples of the present disclosure.
Figure 12A:
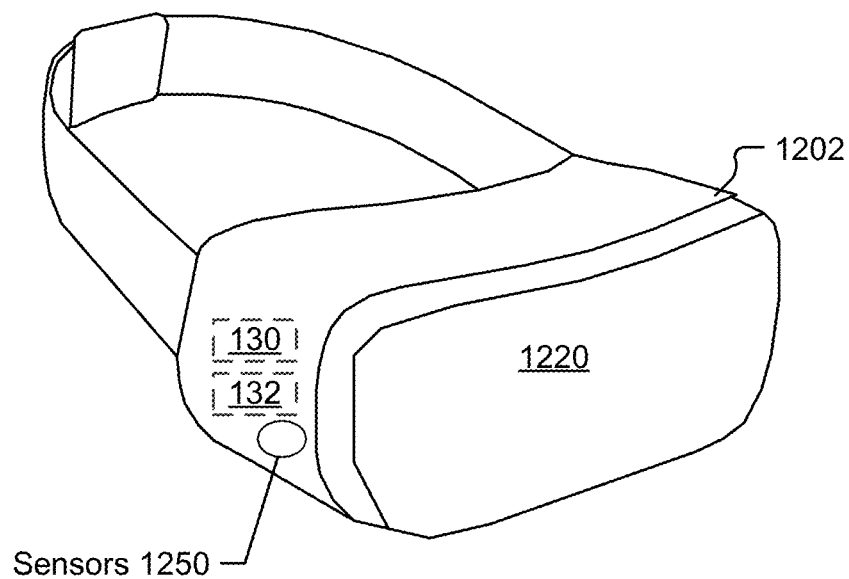
FIG. 12A is a diagram of a virtual reality or augmented reality headset operable to process multi-modal user input, in accordance with some examples of the present disclosure.
Figure 12B:
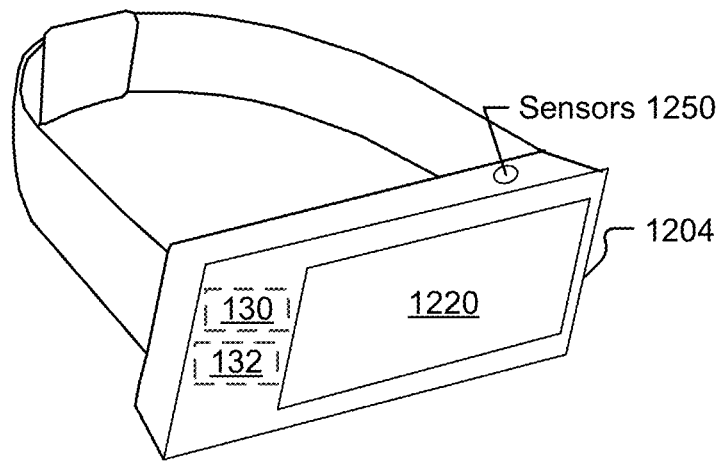
FIG. 12B is a diagram of a wearable electronic device operable to process multi-modal user input, in accordance with some examples of the present disclosure.
Figure 13:
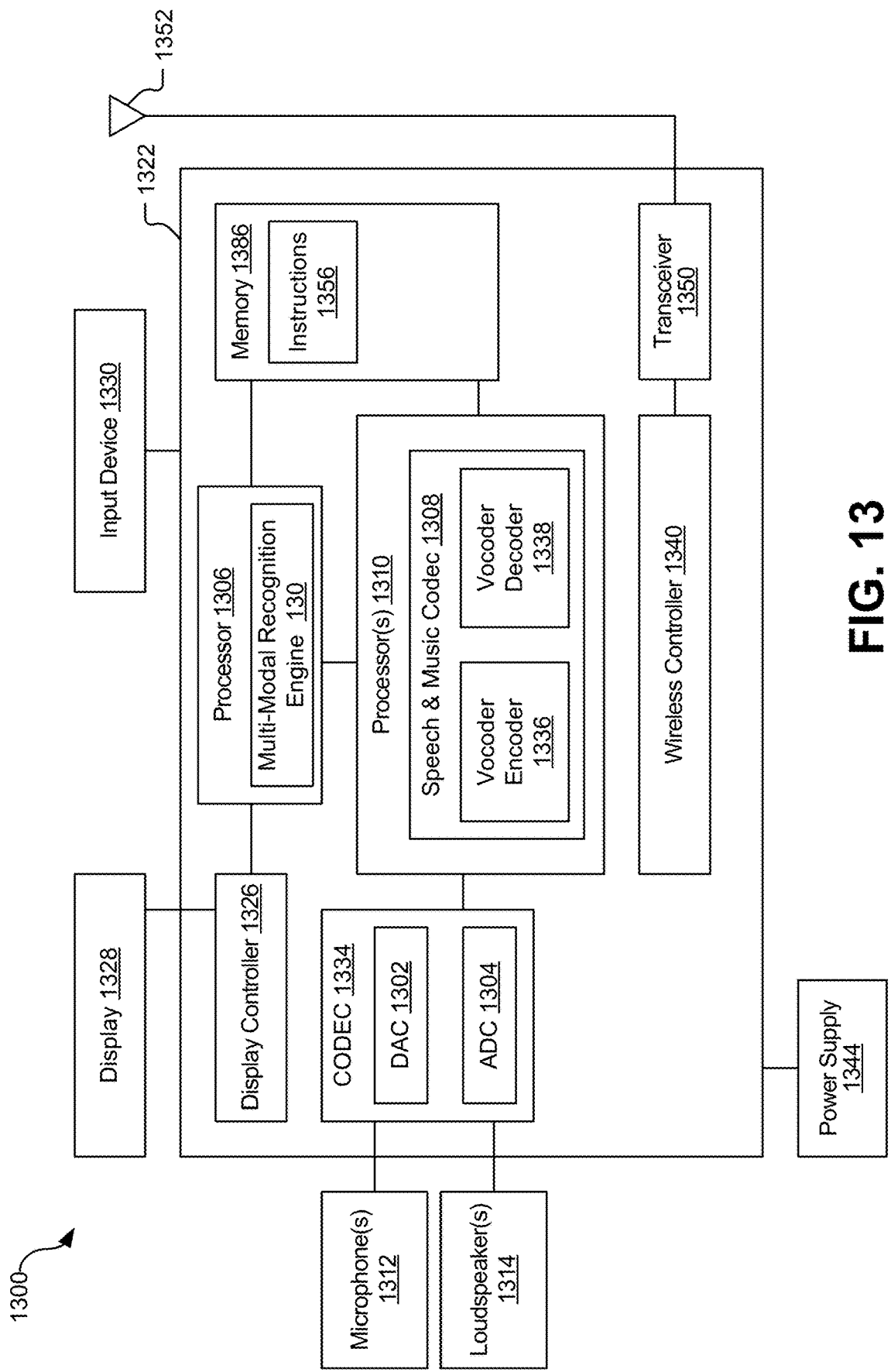
FIG. 13 is a block diagram of a particular illustrative example of a device that is operable to process multi-modal user input, in accordance with some examples of the present disclosure.

FIG. 5 depicts an implementation 500 of a device 502 that includes the multi-modal recognition engine 130 and the feedback message generator 132 integrated in a discrete component, such as a semiconductor chip or package as described further with reference to FIG. 13. To illustrate, the device 502 can include one or more processors (e.g., the processor 108) configured to execute stored instructions to perform operations described with respect to the multi-modal recognition engine 130 and the feedback message generator 132. The device 502 includes a sensor data input 510, such as a first bus interface, to enable sensor data 504 to be received from one or more sensors external to the device 502, such as data from one or more of the input devices 112-116 of FIG. 1. The device 502 also includes an output 512, such as a second bus interface, to enable sending of the feedback message 144 (e.g., to the output device 120). The device 502 enables implementation of multi-modal user interface processing as a component in a system that includes multiple sensors and an output device, such as in a vehicle as depicted in FIG. 11, a virtual reality or augmented reality headset as depicted in FIG. 12A, a wearable electronic device as depicted in FIG. 12B, or a wireless communication device as depicted in FIG. 13.

Figure 6:
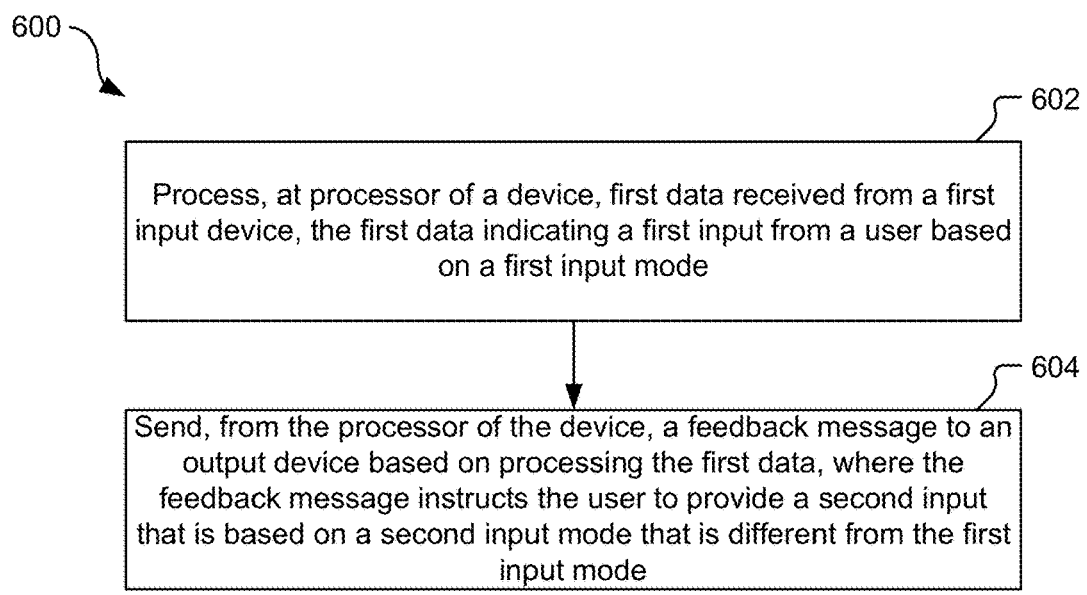
FIG. 6 is a diagram of an implementation of a method of processing multi-modal user input that may be performed by the device of FIG. 1, in accordance with some examples of the present disclosure.

Referring to FIG. 6, a particular implementation of a method 600 of processing multi-modal user input is depicted that may be performed by the device 110 or control unit 104 of FIG. 1, the device 502 of FIG. 5, or both, as illustrative, non-limiting examples.

The method 600 includes processing, at a processor of a device, first data received from a first input device, at 602. The first data indicates a first input from a user based on a first input mode. For example, referring to FIG. 1, the processor 108 processes the first data 142 received from the first input device 112. The first data 142 indicates the first input 140 from the user 102 based on the first input mode.

The method 600 also includes sending, from the processor of the device, a feedback message to an output device based on processing the first data, at 604. The feedback message instructs the user to provide a second input that is based on a second input mode that is different from the first input mode. For example, referring to FIG. 1, the control unit 104 sends the feedback message 144 to the output device 120 based on processing the first data 142. The feedback message 144 instructs the user 102 to provide the second input 148 that is based on the second input mode.

The method 600 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 600 may be performed by a processor that executes instructions, such as described herein.

Figure 7:
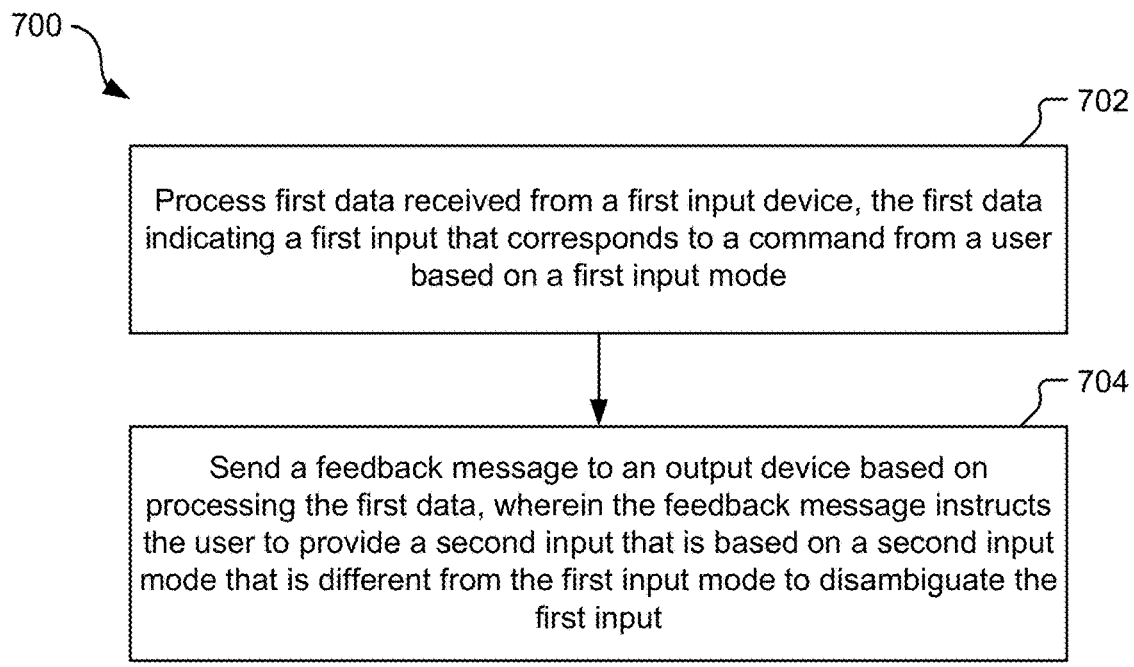
FIG. 7 is a diagram of another implementation of a method of processing multi-modal user input that may be performed by the device of FIG. 1, in accordance with some examples of the present disclosure.

Referring to FIG. 7, a particular implementation of a method 700 of processing multi-modal user input is depicted that may be performed by the control unit 104 of FIG. 1, the device 502 of FIG. 5, or both, as illustrative, non-limiting examples.

The method 700 includes processing first data received from a first input device, at 702. The first data indicates a first input that corresponds to a command from a user based on a first input mode. For example, referring to FIG. 1, the processor 108 processes the first data 142 received from the first input device 112. The first data 142 indicates the first input 140 that corresponds to the command from the user 102 based on the first input mode.

The method 700 also includes sending a feedback message to an output device based on processing the first data, at 704. The feedback message instructs the user to provide a second input that is based on a second input mode that is different from the first input mode to disambiguate the first input. For example, referring to FIG. 1, the control unit 104 sends the feedback message 144 to the output device 120 based on processing the first data 142. The feedback message 144 instructs the user 102 to provide the second input 148 that is based on the second input mode that is different from the first input mode to disambiguate the first input 140.

The method 700 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 700 may be performed by a processor that executes instructions, such as described herein.

Figure 8:
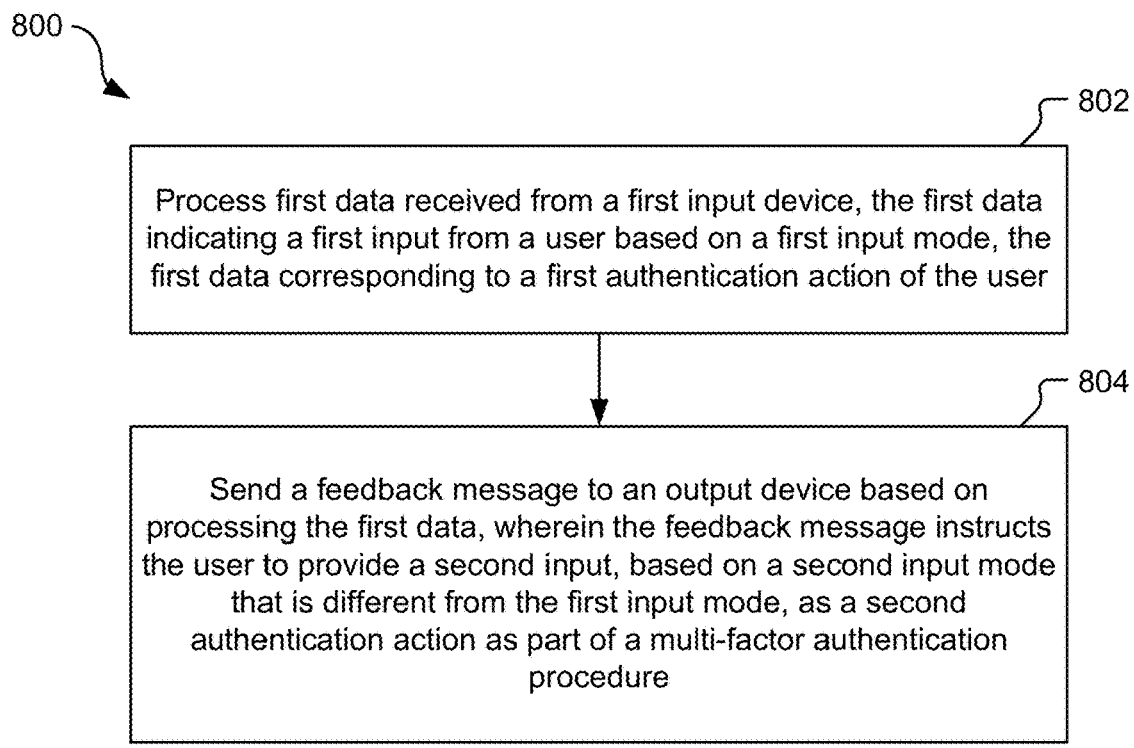
FIG. 8 is a diagram of another implementation of a method of processing multi-modal user input that may be performed by the device of FIG. 1, in accordance with some examples of the present disclosure.

Referring to FIG. 8, a particular implementation of a method 800 of processing multi-modal user input is depicted that may be performed by the control unit 104 of FIG. 1, the device 502 of FIG. 5, or both, as illustrative, non-limiting examples.

The method 800 includes processing first data received from a first input device, at 802. The first data indicates a first input from a user based on a first input mode, and the first data corresponds to a first authentication action of the user. For example, referring to FIG. 1, the processor 108 processes the first data 142 received from the first input device 112. The first data 142 indicates the first input 140 from the user 102 based on the first input mode, and the first data 142 corresponds to the first authentication action of the user 102.

The method 800 also includes sending a feedback message to an output device based on processing the first data, at 804. The feedback message instructs the user to provide a second input, based on a second input mode that is different from the first input mode, as a second authentication action as part of a multi-factor authentication procedure. For example, referring to FIG. 1, the control unit 104 sends the feedback message 144 to the output device 120 based on processing the first data 142. The feedback message 144 instructs the user 102 to provide the second input 148, based on the second input mode that is different form the first input mode, as the second authentication action as part of the multi-factor authentication procedure.

The method 800 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 may be performed by a processor that executes instructions, such as described herein.

Figure 9:
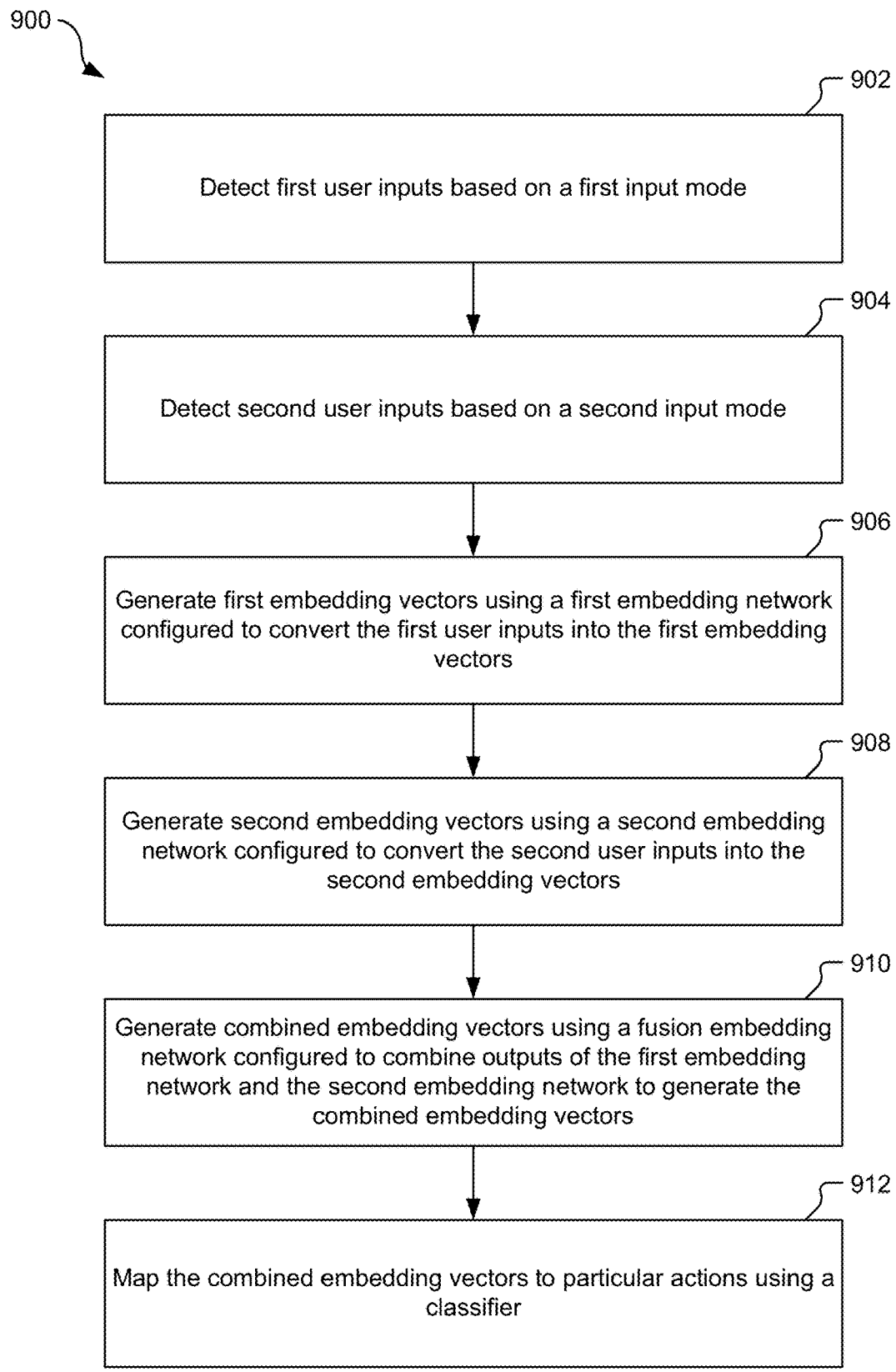
FIG. 9 is a diagram of another implementation of a method of processing multi-modal user input that may be performed by the device of FIG. 1, in accordance with some examples of the present disclosure.

Referring to FIG. 9, a particular implementation of a method 900 of processing multi-modal user input is depicted that may be performed by the control unit 104 of FIG. 1, the device 502 of FIG. 5, or both, as illustrative, non-limiting examples.

The method 900 includes detecting first user inputs based on a first input mode, at 902. For example, referring to FIG. 1, first input device 112 detects the first user input 140 based on the first input mode.

The method 900 also includes detecting second user inputs based on a second input mode, at 904. For example, referring to FIG. 1, the second input device 114 detects the second user input 148 based on the second input mode.

The method 900 also includes generating first embedding vectors using a first embedding network configured to convert the first user inputs into the first embedding vectors, at 906. For example, referring to FIG. 2, the first embedding network 202 generates the first embedding vectors by converting the first user inputs into the first embedding vectors.

The method 900 also includes generating second embedding vectors using a second embedding network configured to convert the second user inputs into the second embedding vectors, at 908. For example, referring to FIG. 2, the second embedding network 204 generates the second embedding vectors by converting the second user inputs into the second imbedding vectors.

The method 900 also includes generating combined embedding vectors using a fusion embedding network configured to combine outputs of the first embedding network and the second embedding network to generate the combined embedding vectors, at 910. For example, referring to FIG. 2, the fusion embedding network 220 combines outputs of the first embedding network 202 and the second embedding network 204 to generate the combined embedding vectors.

The method 900 also includes mapping the combined embedding vectors to particular actions using a classifier, at 912. For example, referring to FIG. 2, the mapping 230 maps the combined embedding vectors to particular actions.

The method 900 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 900 may be performed by a processor that executes instructions, such as described herein.

Figure 10:
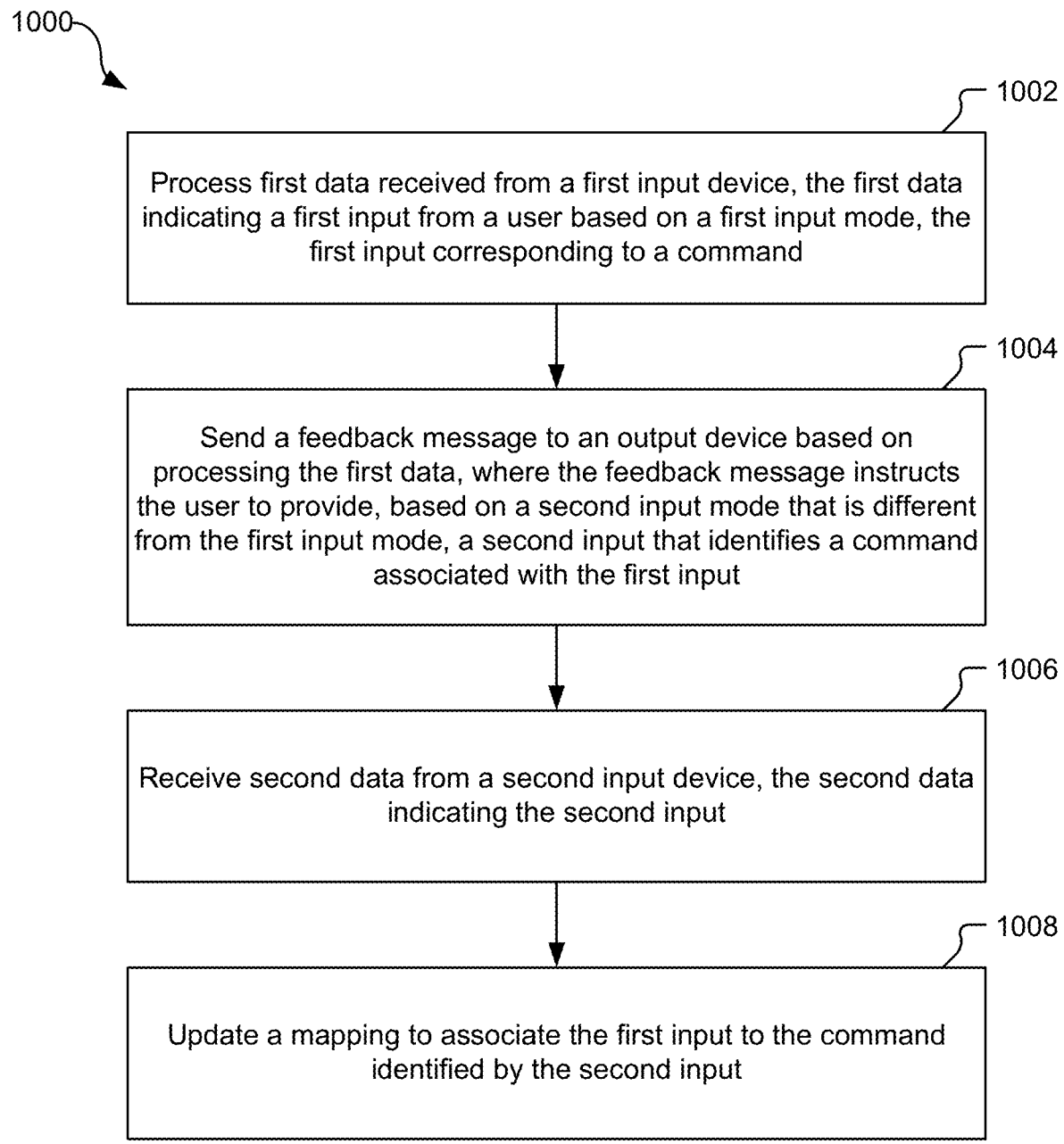
FIG. 10 is a diagram of another implementation of a method of processing multi-modal user input that may be performed by the device of FIG. 1, in accordance with some examples of the present disclosure.

Referring to FIG. 10, a particular implementation of a method 1000 of processing multi-modal user input is depicted that may be performed by the control unit 104 of FIG. 1, the device 502 of FIG. 5, or both, as illustrative, non-limiting examples.

The method 1000 includes processing first data received from a first input device, at 1002. The first data indicates a first input from a user based on a first input mode, and the first input corresponds to a command. For example, referring to FIG. 1, the processor 108 processes the first data 142 received from the first input device 112. The first data 142 indicates the first input 140 from the user 102 based on the first input mode.

The method 1000 also includes sending a feedback message to an output device based on processing the first data, at 1004. The feedback message instructs the user to provide, based on a second input mode that is different from the first input mode, a second input that identifies a command associated with the first input. For example, referring to FIG. 1, the control unit 104 sends the feedback message 144 to the output device 120 based on processing the first data 142. The feedback message 144 instructs the user 102 to re-enter the command associated with the first input 140 using another input mode. In an example, the first input mode is one of a speech mode, a gesture mode, or a video mode, and the second input mode is a different one of the speech mode, the gesture mode, or the video mode.

In some implementations, the feedback message instructs the user to provide the second input to disambiguate the first input. For example, the feedback message may be sent in response to a confidence level associated with recognition processing of the first input failing to satisfy a confidence threshold, such as when the confidence level 234 is less than the confidence threshold 294. In some examples, the first input mode corresponds to a video mode, and the feedback message is sent in response to an ambient light metric having a value below a lighting threshold, such as the ambient light metric 284 having a value less than the lighting threshold 286. In other examples, the first input mode corresponds to a speech mode, and the feedback message is sent in response to a noise metric having a value exceeding a noise threshold, such as the noise metric 280 having a value that is larger than the noise threshold 282.

The method 1000 also includes receiving second data from a second input device, the second data indicating the second input, at 1006. For example, referring to FIG. 1, the control unit 104 receives the second data 150 associated with the second input 148 that identifies the particular command associated with the first input 140.

The method 1000 also includes updating a mapping to associate the first input to the command identified by the second input, at 1008. For example, referring to FIG. 1, the control unit 104 updates the mapping of the user input to commands to associate the first input 140 to the particular command. In some implementations, the updated mapping associates a combination of the first input and the second input with the command, such as to customize the mapping of input to commands for the user so that the command is more reliably recognized via concurrent (e.g., at least partially overlapping in time) receipt of the first input via the first input mode and the second input via the second input mode. In some implementations, updating the mapping includes at least one of updating embedding network data associated with the user (e.g., the first embedding network data 252) or updating weight data associated with the user (e.g., the first weight data 254).

The method 1000 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1000 may be performed by a processor that executes instructions, such as described herein.

FIG. 11 depicts an example of an implementation 1100 of the device 110 integrated into a vehicle dashboard device, such as a car dashboard device 1102. Multiple sensors 1150 can include one or more microphones, cameras, or other sensors, and can correspond to the input devices 112-116 of FIG. 1. Although illustrated in a single location, in other implementations one or more of the sensors 1150 can be positioned at other locations of the vehicle, such as distributed at various locations within a cabin of the vehicle, such as an array of one or more microphones and one or more cameras located proximate to each seat in the vehicle to detect multi-modal inputs from a vehicle operator and from each passenger.

A visual interface device, such as a display 1120, can correspond to the output device 120 and is mounted within or positioned upon (e.g., removably fastened to a vehicle handset mount) the car dashboard device 1102 to be visible to a driver of the car. The multi-modal recognition engine 130 and the feedback message generator 132 are illustrated with dashed borders to indicate that the multi-modal recognition engine 130 and the feedback message generator 132 are not visible to occupants of the vehicle. The multi-modal recognition engine 130 and the feedback message generator 132 may be implemented in a device that also includes the display 1120 and the sensors 1150, such as in the device 110 of FIG. 1, or may be separate from and coupled to the display 1120 and the sensors 1150, such as in the device 502 of FIG. 5.

FIG. 12A depicts an example of the multi-modal recognition engine 130 and the feedback message generator 132 integrated into a headset 1202, such as a virtual reality, augmented reality, or mixed reality headset. A visual interface device, such as a display 1220, can correspond to the output device 120 and is positioned in front of the user's eyes to enable display of augmented reality or virtual reality images or scenes to the user while the headset 1202 is worn. Sensors 1250 can include one or more microphones, cameras, or other sensors, and can correspond to the input devices 112-116 of FIG. 1. Although illustrated in a single location, in other implementations one or more of the sensors 1250 can be positioned at other locations of the headset 1202, such as an array of one or more microphones and one or more cameras distributed around the headset 1202 to detect multi-modal inputs.

FIG. 12B depicts an example of the multi-modal recognition engine 130 and the feedback message generator 132 integrated into a wearable electronic device 1204, illustrated as a "smart watch," that includes the display 1220 and the sensors 1250. The sensors 1250 enable detection, for example, of user input based on modalities such as video, speech, and gesture. Also, although illustrated in a single location, in other implementations one or more of the sensors 1250 can be positioned at other locations of the wearable electronic device 1204.

FIG. 13 depicts a block diagram of a particular illustrative implementation of a device 1300 that includes the multi-modal recognition engine 130, such as in a wireless communication device implementation (e.g., a smartphone) or a digital assistant device implementation. In various implementations, the device 1300 may have more or fewer components than illustrated in FIG. 13. In an illustrative implementation, the device 1300 may correspond to the device 110. In an illustrative implementation, the device 1300 may perform one or more operations described with reference to FIGS. 1-12B.

In a particular implementation, the device 1300 includes a processor 1306 (e.g., a central processing unit (CPU) that corresponds to the processor 108) that includes the multi-modal recognition engine 130. The device 1300 may include one or more additional processors 1310 (e.g., one or more DSPs). The processors 1310 may include a speech and music coder-decoder (CODEC) 1308. The speech and music codec 1308 may include a voice coder ("vocoder") encoder 1336, a vocoder decoder 1338, or both.

The device 1300 may include a memory 1386 and a CODEC 1334. The memory 1386 may correspond to the memory 106 and may include instructions 1356 that are executable by the processor 1306 (or the one or more additional processors 1310) to implement the functionality described with reference to the multi-modal recognition engine 130, the feedback message generator 132, one or more of the applications 240, or any combination thereof. The device 1300 may include a wireless controller 1340 coupled, via a transceiver 1350, to one or more antennas 1352. In some implementations, the one or more antennas 1352 include one or more antennas configured to receive data indicative of a gesture input.

The device 1300 may include a display 1328 (e.g., the output device 120) coupled to a display controller 1326. The display 1328 may be configured to represent a graphical user interface that outputs the feedback message 144 (e.g., the instruction 146). The CODEC 1334 may include a digital-to-analog converter (DAC) 1302 and an analog-to-digital converter (ADC) 1304. In a particular implementation, the CODEC 1334 may receive analog signals from one or more microphones 1312 (e.g., the first input device 112 configured to capture audio input that includes one or more keywords or voice commands), convert the analog signals to digital signals using the analog-to-digital converter 1304, and provide the digital signals to the speech and music codec 1308. The speech and music codec 1308 may process the digital signals.

In a particular implementation, the speech and music codec 1308 may provide digital signals to the CODEC 1334 that represent an audio playback signal. The CODEC 1334 may convert the digital signals to analog signals using the digital-to-analog converter 1302 and may provide the analog signals to one or more loudspeakers 1314 to generate an audible signal. The one or more loudspeakers 1314 can correspond to the output device 120 and can be configured to render the feedback message 144 of FIG. 1 or to direct the feedback message 144 to the user.

In a particular implementation, the device 1300 includes one or more input devices 1330. The input device(s) 1330 can correspond to one or more of the input devices 112-116 of FIG. 1. For example, the input device(s) 1330 can include one or more cameras configured to capture video input that includes one or more gestures or visual commands.

In a particular implementation, the device 1300 may be included in a system-in-package or system-on-chip device 1322. In a particular implementation, the memory 1386, the processor 1306, the processors 1310, the display controller 1326, the CODEC 1334, and the wireless controller 1340 are included in a system-in-package or system-on-chip device 1322. In a particular implementation, the input device(s) 1330 (e.g., one or more of the input devices 112-116 of FIG. 1) and a power supply 1344 are coupled to the system-in-package or system-on-chip device 1322. Moreover, in a particular implementation, as illustrated in FIG. 13, the display 1328, the input device 1330, the microphone 1312, the antenna 1352, and the power supply 1344 are external to the system-in-package or system-on-chip device 1322. In a particular implementation, each of the display 1328, the input device 1330, the microphone(s) 1312, the loudspeaker(s) 1314, the antenna 1352, and the power supply 1344 may be coupled to a component of the system-in-package or system-on-chip device 1322, such as an interface or a controller.

The device 1300 may include a mobile communication device, a smart phone, a cellular phone, a laptop computer, a computer, a tablet, a personal digital assistant, a display device, a television, a gaming console, a music player, a radio, a digital video player, a digital video disc (DVD) or Blu-ray disc player, a tuner, a camera, a navigation device, a virtual reality or augmented reality headset, a wearable electronic device, a vehicle console device, or any combination thereof, as illustrative, non-limiting examples.

In conjunction with the described implementations, a device for multi-modal user input includes a multi-modal recognition engine that processes first data received from a first input device. The first data indicates a first input from a user based on a first input mode (e.g., a speech mode, a gesture mode, or a video mode). A feedback message generator sends a feedback message to an output device based on processing the first data, instructing the user to provide a second input that is based on a second input mode that is different from the first input mode.

In conjunction with the described implementations, a device for multi-modal user input includes a multi-modal recognition engine that processes first data received from a first input device. The first data indicates a first input from a user based on a first input mode. A feedback message generator sends a feedback message to an output device based on processing the first data. The feedback message instructs the user to identify an action to be associated with the first input. The multi-modal recognition engine receives a second input that identifies a particular action to be associated with the first input and updates a mapping of user inputs to actions to associate the first input to the particular action.

In conjunction with the described implementations, an apparatus for multi-modal user input includes means for processing first data received from a first input device. The first data indicates a first input from a user based on a first input mode, and the first input corresponds to a command. For example, the means for processing the first data can include the processor 108, the multi-modal recognition engine 130, the instructions 1356 executable by the processor(s) 1306, 1310, one or more other device, modules, circuits, components, or a combination thereof.

The apparatus includes means for sending a feedback message to an output device based on processing the first data. The feedback message instructs the user to provide, based on a second input mode that is different from the first input mode, a second input that identifies a command associated with the first input. For example, the means for sending can include the processor 108, the multi-modal recognition engine 130, the feedback message generator 132, the instructions 1356 executable by the processor(s) 1306, 1310, one or more other device, modules, circuits, components, or a combination thereof.

The apparatus includes means for receiving second data from a second input device, the second data indicating the second input. For example, the means for receiving the second data can include the processor 108, the multi-modal recognition engine 130, the instructions 1356 executable by the processor(s) 1306, 1310, one or more other device, modules, circuits, components, or a combination thereof.

The apparatus also includes means for updating a mapping to associate the first input to the command identified by the second input. For example, the means for updating can include the processor 108, the multi-modal recognition engine 130, the data adjustor 292, the instructions 1356 executable by the processor(s) 1306, 1310, one or more other device, modules, circuits, components, or a combination thereof.

In some implementations, a non-transitory computer-readable medium (e.g., the memory 106, the memory 1386, or any combination thereof) includes instructions (e.g., the instructions 1356) that, when executed by one or more processors of a device (e.g., the processor 108, the processor 1306, the processor(s) 1310, or any combination thereof), cause the one or more processors to perform operations for processing multi-modal user input, such as by performing operations corresponding to all or part of one or more of the methods of FIGS. 6-10. In an example, the instructions, when executed by the one or more processors, cause the one or more processors to process first data received from a first input device. The first data indicates a first input from a user based on a first input mode, the first input corresponding to a command. The instructions, when executed by the one or more processors, cause the one or more processors to send a feedback message to an output device based on processing the first data. The feedback message instructs the user to provide, based on a second input mode that is different from the first input mode, a second input that identifies a command associated with the first input. The instructions, when executed by the one or more processors, cause the one or more processors to receive second data from a second input device, the second data indicating the second input. The instructions, when executed by the one or more processors, also cause the one or more processors to update a mapping to associate the first input to the command identified by the second input.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, and such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device for multi-modal user input, the device comprising:
one or more processors configured to:
process first data received from a first input device, the first data indicating a first input from a user based on a first input mode;
send a feedback message to an output device based on processing the first data, wherein the feedback message instructs the user to provide, based on a second input mode that is different from the first input mode, a second input that identifies a command associated with the first input;
receive second data from a second input device, the second data indicating the second input;
identify the command based on the second data; and
update a mapping to associate the first input to the command to enable activation of the command in response to subsequent receipt of the first data via the first input device.

2. The device of claim 1, wherein the first input mode is one of a speech mode, a gesture mode, or a video mode, and wherein the second input mode is a different one of the speech mode, the gesture mode, or the video mode.

3. The device of claim 1, wherein the feedback message instructs the user to provide the second input to disambiguate the first input.

4. The device of claim 3, wherein the one or more processors are further configured to send the feedback message in response to a confidence level associated with recognition processing of the first input failing to satisfy a confidence threshold.

5. The device of claim 1, wherein the updated mapping associates a combination of the first input and the second input with the command.

6. The device of claim 1, wherein the one or more processors include a multi-modal recognition engine, the multi-modal recognition engine including:
a fusion embedding network configured to combine outputs of a first embedding network associated with the first input mode and a second embedding network associated with the second input mode to generate combined embedding vectors; and
a classifier configured to map the combined embedding vectors to particular commands.

7. The device of claim 6, further comprising a memory configured to store:
first embedding network data and first weight data corresponding to the user; and
second embedding network data and second weight data corresponding to a second user, the first embedding network data differing from the second embedding network data based on input command differences between the user and the second user, and the first weight data differing from the second weight data based on input mode reliability differences between the user and the second user.

8. The device of claim 1, wherein the first input mode corresponds to a video mode, and wherein the one or more processors are configured to send the feedback message in response to an ambient light metric having a value below a lighting threshold.

9. The device of claim 1, wherein the first input mode corresponds to a speech mode, and wherein the one or more processors are configured to send the feedback message in response to a noise metric having a value exceeding a noise threshold.

10. The device of claim 1, further comprising a display configured to represent a graphical user interface.

11. The device of claim 1, further comprising one or more microphones configured to capture audio input that includes one or more keywords or voice commands.

12. The device of claim 1, further comprising one or more cameras configured to capture video input that includes one or more gestures or visual commands.

13. The device of claim 1, further comprising one or more antennas configured to receive data indicative of a gesture input.

14. The device of claim 1, further comprising one or more loudspeakers configured to render or direct the feedback message to the user.

15. The device of claim 1, wherein the user includes a robot or other electronic device.

16. The device of claim 1, wherein the first input device and the output device are incorporated into a virtual reality headset or augmented reality headset.

17. The device of claim 1, wherein the first input device and the output device are incorporated into a vehicle.

18. A method for multi-modal user input, the method comprising:
processing, at one or more processors of a device, first data received from a first input device, the first data indicating a first input from a user based on a first input mode;
sending, from the one or more processors, a feedback message to an output device based on processing the first data, wherein the feedback message instructs the user to provide, based on a second input mode that is different from the first input mode, a second input that identifies a command associated with the first input;

receiving, at the one or more processors, second data from a second input device, the second data indicating the second input;

identifying the command based on the second data; and updating, at the one or more processors, a mapping to associate the first input to the command to enable activation of the command in response to subsequent receipt of the first data via the first input device.

19. The method of claim 18, wherein the first input mode is one of a speech mode, a gesture mode, or a video mode, and wherein the second input mode is a different one of the speech mode, the gesture mode, or the video mode.

20. The method of claim 18, wherein the feedback message instructs the user to provide the second input to disambiguate the first input.

21. The method of claim 20, wherein the feedback message is sent in response to a confidence level associated with recognition processing of the first input failing to satisfy a confidence threshold.

22. The method of claim 18, wherein the updated mapping associates a combination of the first input and the second input with the command.

23. The method of claim 18, wherein updating the mapping includes at least one of:
updating embedding network data associated with the user; or
updating weight data associated with the user.

24. The method of claim 18, wherein the first input mode corresponds to a video mode, and wherein the feedback message is sent in response to an ambient light metric having a value below a lighting threshold.

25. The method of claim 18, wherein the first input mode corresponds to a speech mode, and wherein the feedback message is sent in response to a noise metric having a value exceeding a noise threshold.

26. An apparatus for multi-modal user input, the apparatus comprising:
means for processing first data received from a first input device, the first data indicating a first input from a user based on a first input mode;
means for sending a feedback message to an output device based on processing the first data, wherein the feedback message instructs the user to provide, based on a second input mode that is different from the first input mode, a second input that identifies a command associated with the first input;
means for receiving second data from a second input device, the second data indicating the second input;
means for identifying the command based on the second data; and
means for updating a mapping to associate the first input to the command to enable activation of the command in response to subsequent receipt of the first data via the first input device.

27. The apparatus of claim 26, wherein the updated mapping associates a combination of the first input and the second input with the command.

28. A non-transitory computer-readable medium comprising instructions that, when executed by one or more processors of a device, cause the one or more processors to:
process first data received from a first input device, the first data indicating a first input from a user based on a first input mode;
send a feedback message to an output device based on processing the first data, wherein the feedback message instructs the user to provide, based on a second input mode that is different from the first input mode, a second input that identifies a command associated with the first input;
receive second data from a second input device, the second data indicating the second input;
identify the command based on the second data; and
update a mapping to associate the first input to the command to enable activation of the command in response to subsequent receipt of the first data via the first input device.

29. The non-transitory computer-readable medium of claim 28, wherein the first input mode corresponds to a video mode, and wherein the feedback message is sent in response to an ambient light metric having a value below a lighting threshold.

30. The non-transitory computer-readable medium of claim 28, wherein the first input mode corresponds to a speech mode, and wherein the feedback message is sent in response to a noise metric having a value exceeding a noise threshold.

* * * * *